US012756738B1

United States Patent

(12) United States Patent
Bryslawskyj et al.

(10) Patent No.: US 12,756,738 B1
(45) Date of Patent: Oct. 6, 2026

(54) CONTEXT-AWARE STEGANOGRAPHY DETECTION AT CLOUD NETWORKS

(71) Applicant: Netskope, Inc., Santa Clara, CA (US)

(72) Inventors: Jason Bogdan Bryslawskyj, San Diego, CA (US); Yi Zhang, Santa Clara, CA (US); Kaukab Enayet Syed, Bangalore (IN); Niranjan Koduri, Pleasanton, CA (US); Emanoel Daryoush, San Jose, CA (US)

(73) Assignee: Netskope, Inc., Santa Clara, CA (US)

( * ) Notice: Subject to any disclaimer, the term of this patent is extended or adjusted under 35 U.S.C. 154(b) by 0 days.

(21) Appl. No.: 19/466,200

(22) Filed: Jan. 30, 2026

(51) Int. Cl.
*H04L 9/40* (2022.01)

(52) U.S. Cl.
CPC ........ *H04L 63/1433* (2013.01); *H04L 63/145* (2013.01)

(58) Field of Classification Search
CPC .......................... H04L 63/1433; H04L 63/145
See application file for complete search history.

(56) References Cited

U.S. PATENT DOCUMENTS 8,726,396 B1 5/2014 Dodke
8,826,452 B1 9/2014 He et al.
11,575,704 B2 2/2023 MacLeod et al.
11,805,138 B2 10/2023 Paul et al.
11,985,170 B2 5/2024 Narayanaswamy et al.
12,267,347 B2 4/2025 Crabtree et al.
12,292,972 B2 5/2025 Singh
12,580,935 B1 * 3/2026 Singh ................. G06F 9/45558

(Continued)

FOREIGN PATENT DOCUMENTS

CN 107292315 A 10/2017
CN 108509775 A 9/2018

(Continued)

OTHER PUBLICATIONS

Anuratha K., et al., "Secure Web User Privacy with Steganalysis of Images using Deep Learning," Proceedings of the Seventh International Conference on Communication and Electronics Systems (ICCES), 2022, pp. 1215-1220.

(Continued)

*Primary Examiner* — Stephen T Gundry
(74) *Attorney, Agent, or Firm* — MUGHAL GAUDRY & FRANKLIN PC

(57) ABSTRACT

A data loss prevention (DLP) system to prevent data exfiltration across multiple tenants in a cloud network includes a tenant and a DLP server. The tenant includes multiple end-user devices. The DLP server functions as middleware, intercepts network traffic from an end-user device at an application layer, retrieves multiple images, and extracts various features from them. From the features, the DLP server infers a steganographic content in an image using a machine learning (ML) engine, computes a risk score for the end-user device, and compares the risk score against a primary threshold. The DLP server increments a risk count when the risk score exceeds the primary threshold, analyzes a contextual information of the end-user device, and compares the risk count against a secondary threshold. The DLP server further generates an alert based on various policies when the risk count exceeds the secondary threshold.

20 Claims, 15 Drawing Sheets

(56) References Cited

U.S. PATENT DOCUMENTS

| | | | | |
|---|---|---|---|---|
| 12,580,936 | B1 * | 3/2026 | Palmer | G06F 9/45558 |
| 12,598,205 | B1 * | 4/2026 | Hayes | H04L 63/1425 |
| 12,615,297 | B2 * | 4/2026 | Saripalli | H04L 63/20 |
| 2016/0042193 | A1 | 2/2016 | Hanner, Sr. et al. | |
| 2021/0326461 | A1 * | 10/2021 | Paul | H04L 63/1425 |
| 2025/0379888 | A1 * | 12/2025 | Danino | G06F 16/955 |
| 2026/0074947 | A1 * | 3/2026 | Ramadass | H04L 41/0631 |
| 2026/0087166 | A1 * | 3/2026 | Assayag | G06F 21/6245 |
| 2026/0087169 | A1 * | 3/2026 | Danino | G06F 21/6245 |
| 2026/0089509 | A1 * | 3/2026 | Banerjee | H04W 12/088 |
| 2026/0122111 | A1 * | 4/2026 | Sharieh | H04L 63/20 |

FOREIGN PATENT DOCUMENTS

| | | | |
|---|---|---|---|
| CN | 115098859 | A | 9/2022 |
| CN | 118555346 | A | 8/2024 |
| EP | 1849124 | B1 | 10/2007 |
| EP | 3756130 | A1 | 12/2020 |
| WO | 2025008814 | A1 | 1/2025 |

OTHER PUBLICATIONS

Bhasin V., et al., "StegTrack: Tracking images with hidden content," Association for Computing Machinery (ACM), Aug. 10-13, 2015, Kochi, India, pp. 318-323.

Sahoo, P.K., et al., "Implementing Steganalysis using Machine Learning," International Journal of Computer Applications (0975-8887), vol. 184-No. 25, Aug. 2022, pp. 25-29.

Samuel H.D et al., "Automation Detection of Malware and Stenographical Content using Machine Learning," Proceedings of the Sixth International Conference on Computing Methodologies and Communication (ICCMC), 2022, pp. 889-894.

* cited by examiner

900

[
{
"id" : "906782",
"src_country" : "USA",
"src_zipcode" : "94301",
"src_region" : "Washington D.C",
"src_ip" : "28.101.322.761",
"user_login" : "abc@tenant.netskope.com",
"app" : "salesforce",
"activity" : "upload",
"threat_type": "data leakage",
"threat_class" : "steganographic",
"policy_based_authorization" : "no"
"org" : "tenant.netskope.com",
"numbytes" : "705412",
"timestamp" : "1589453478 4",
"url" : "abc11.salesforce.com/tenant/status244",
}
]

FIG. 9

CONTEXT-AWARE STEGANOGRAPHY DETECTION AT CLOUD NETWORKS

FIELD OF THE DISCLOSURE

The technology disclosed generally relates to the detection of data exfiltration in a cloud environment and, by way of example, to systems and methods for detecting data exfiltration and malware payloads in network traffic, among other applications. Also disclosed are systems and methods for context-aware data loss prevention using machine learning (ML) techniques in the cloud environment.

BACKGROUND

Data and content sharing across distributed teams is crucial for modern enterprises. In cloud-based systems, users or endpoints access and share data, such as files, resources, and applications, serving various purposes including training, communication, and documentation. Data and content sharing in the cloud-based systems promote dynamic communication by providing engaging content and supporting version control and automated backups. Content sharing further reduces the risk of data loss and integrates with productivity tools to enhance workflow efficiency. However, sharing content across the distributed teams poses risks, including potential data security breaches due to embedded sensitive information.

Enterprises face severe consequences from data security breaches in a cloud environment because sensitive information, such as financial records, identification data, or intellectual property, is often centralized and accessible from multiple endpoints. The content sharing that includes sensitive information breaches, such as data embedded into the shared content, leads to unauthorized access to data and reputational damage for the enterprises. Reputation damage is a tangible risk that impacts customer trust, employee morale, and relationships with partners and stakeholders.

SUMMARY

In one embodiment, a data loss prevention (DLP) system to prevent data exfiltration across multiple tenants in a cloud network that includes a tenant and a DLP server. The tenant includes multiple end-user devices. The DLP server functions as a middleware, intercepts network traffic of an end-user device at an application layer, retrieves multiple images from the network traffic, and extracts different features from an image. From the features, the DLP server infers a steganographic content in the image using a machine learning (ML) engine, computes a risk score for the end-user device, and compares the risk score against a primary threshold. The DLP server increments a risk count when the risk score exceeds the primary threshold, analyses a contextual information of the end-user device, and compares the risk count against a secondary threshold. The DLP server further generates an alert based on various policies when the risk count exceeds the secondary threshold.

In an embodiment, a data loss prevention (DLP) system to prevent data exfiltration across multiple tenants in a cloud network that includes a tenant and a DLP server. The tenant includes multiple end-user devices. The DLP server functions as a middleware and intercepts network traffic of an end-user device at an application layer of the cloud network. The DLP server retrieves multiple images from the network traffic and extracts different features from an image. The image includes an encrypted image and/or an unencrypted image. The features include a pixel color chi-squared, an image type, and/or an image entropy. The features further include a byte-wise mean, a byte-wise chi-squared, a serial correlation coefficient, a pi monte-carlo value, a standard deviation (SD) in a channel entropy, and a spatial pair analysis (SPA) score. The DLP server assigns a priority to the features based on an associated memory footprint. From the features, the DLP server infers, via a machine learning (ML) engine, a steganographic content in the image and computes a risk score for the end-user device based on the steganographic content. The ML engine includes different ML classifiers that further include pre-trained classifiers and customized classifiers. The DLP server further compares the risk score against a primary threshold and increments a risk count when the risk score exceeds the primary threshold. The DLP server analyses a contextual information of the end-user device from the application layer. The contextual information includes a device identifier (ID), session details, profile data, behavioral data, and/or metadata of the end-user device. Based on the contextual information, the DLP server further compares the risk count against a secondary threshold and generates an alert based on multiple policies when the risk count exceeds the secondary threshold. The DLP server analyzes the contextual information and generates the alert based on a detection of the steganographic content in the image and/or a malware payload in the network traffic. The malware payload includes an unencrypted malware from a malware database. The risk score indicates a probability of the steganographic content and/or the malware payload in the network traffic.

In another embodiment, a data loss prevention (DLP) method to prevent data exfiltration across multiple tenants in a cloud network. In one step, the DLP method includes intercepting network traffic of an end-user device at an application layer of the cloud network via a DLP server. The DLP server functions as a middleware and includes retrieving multiple images from the network traffic and extracting different features from an image. The features include a pixel color chi-squared, an image type, and/or an image entropy. The features further include a byte-wise mean, a byte-wise chi-squared, a serial correlation coefficient, a pi monte-carlo value, a standard deviation (SD) in a channel entropy, and a spatial pair analysis (SPA) score. The DLP server includes assigning a priority to the features based on an associated memory footprint. From the features, the DLP server includes inferring, via a machine learning (ML) engine, a steganographic content in the image and computing a risk score for the end-user device based on the steganographic content. The DLP server further includes comparing the risk score against a primary threshold, incrementing a risk count when the risk score exceeds the primary threshold, and analyzing a contextual information of the end-user device. The contextual information includes a device identifier (ID), session details, profile data, behavioral data, and/or metadata of the end-user device. Based on the contextual information, the DLP server further includes comparing the risk count against a secondary threshold and generating an alert based on multiple policies when the risk count exceeds the secondary threshold. The DLP server further includes analyzing the contextual information and generating the alert based on a detection of the steganographic content in the image and/or a malware payload in the network traffic. The malware payload includes an unencrypted malware from a malware database. The risk score indicates a probability of the steganographic content and/or the malware payload in the network traffic.

In yet another embodiment, a computer-readable medium having computer-executable instructions embodied thereon that, when executed by one or more processors, facilitates a data loss prevention (DLP) method to prevent data exfiltration across multiple tenants in a cloud network. In one step, the DLP method includes intercepting network traffic of an end-user device at an application layer of the cloud network and retrieving multiple images from the network traffic. The DLP method further includes extracting different features from the images. An image includes an encrypted image and/or an unencrypted image. The features include a pixel color chi-squared, an image type, and/or an image entropy. The features further include a byte-wise mean, a byte-wise chi-squared, a serial correlation coefficient, a pi monte-carlo value, a standard deviation (SD) in a channel entropy, and a spatial pair analysis (SPA) score. From the features, the DLP method includes inferring, via a machine learning (ML) engine, a steganographic content in the image and computing a risk score for the end-user device based on the steganographic content. The DLP method further includes comparing the risk score against a primary threshold and incrementing a risk count when the risk score exceeds the primary threshold. Based on a contextual information of the end-user device from the application layer, the DLP method further includes comparing the risk count against a secondary threshold and generating an alert based on multiple policies when the risk count exceeds the secondary threshold. The contextual information includes a device identifier (ID), session details, profile data, behavioral data, and/or metadata of the end-user device. The DLP method further includes analyzing the contextual information and generating the alert based on a detection of the steganographic content in the image and/or a malware payload in the network traffic. The malware payload includes an unencrypted malware from a malware database. The risk score indicates a probability of the steganographic content and/or the malware payload in the network traffic.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures:

FIG. 9 illustrates an alert report generated for a user entity behavior analyzer (UEBA) via the DLP server;

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment (s) will provide those skilled in the art with an enabling description for implementing a preferred exemplary embodiment. It is understood that various changes may be made in the function and arrangement of elements without departing from the spirit and scope as set forth in the appended claims.

Figure 1A:
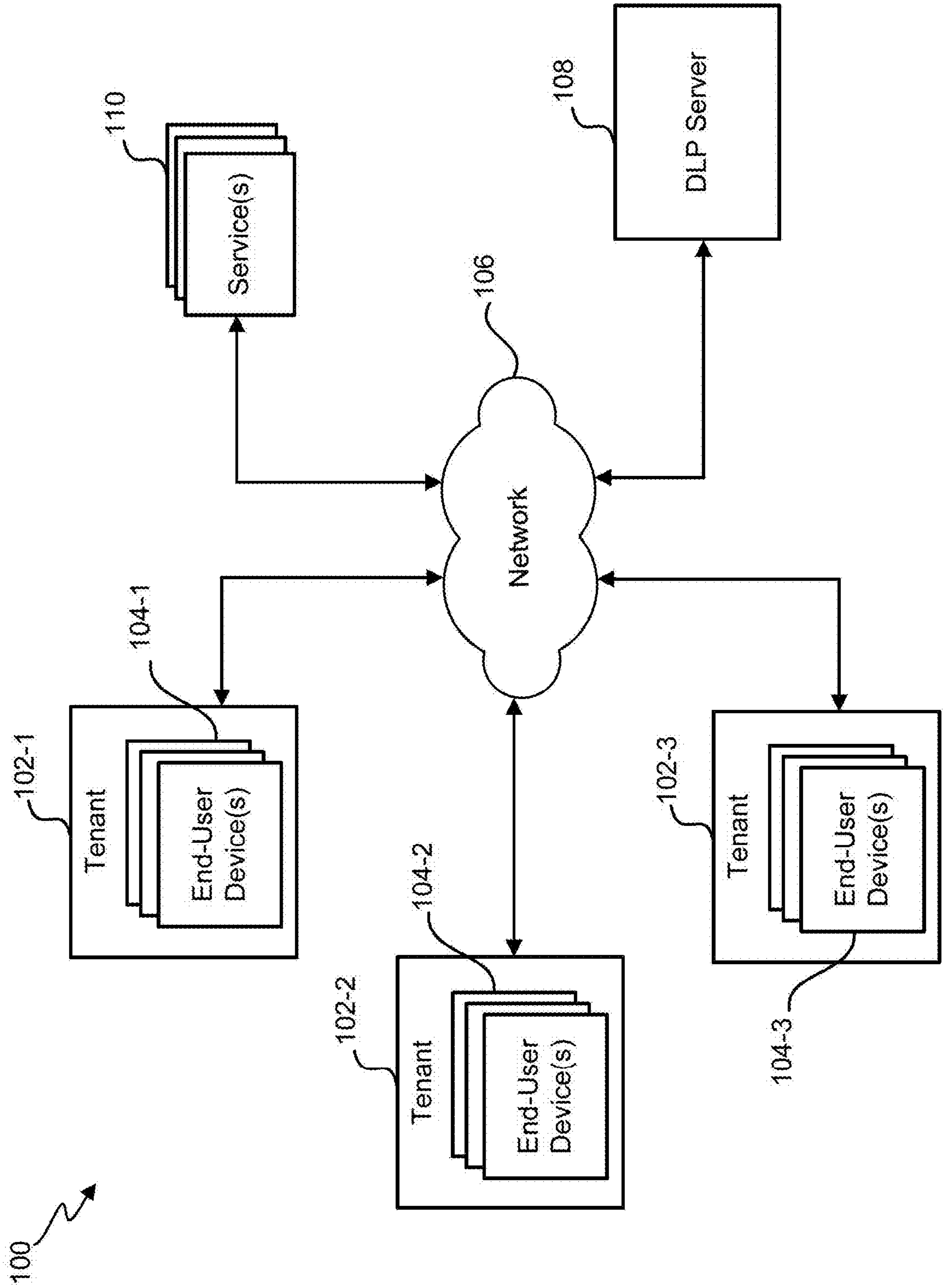
FIG. 1A illustrates a block diagram of a data loss prevention (DLP) system in a cloud network.

Referring to FIG. 1A, a block diagram of a data loss prevention (DLP) system 100 in a cloud network is shown as an embodiment. The presence of a multi-tenant environment in the cloud network helps in handling security, quality of service compliance, service request metering, and other policy-based prevention activities relating to the DLP system 100. The DLP system 100 includes tenant(s) 102-1, 102-2, 102-3, collectively designated as tenant(s) 102, end-user device(s) 104-1, 104-2, 104-3, collectively designated as end-user device(s) 104, a network 106, a DLP server 108, and service(s) 110. The tenant(s) 102 include the end-user device(s) 104. The end-user device(s) 104, such as a smartphone, tablet, personal computer (PC), Internet of Things (IoT) device, or any other computing device, communicate with the DLP server 108 via the network 106. Enterprises rely on data centers or points-of-presence (PoPs) to run operating systems (OS) for the end-user device(s) 104, such as Windows™, iOS™, Android™, Linux, set-top box OSes, and Chromebook™. The PoPs are present across different geographic locations within regions, states, or countries. The PoPs are interconnected and exchange status information among themselves and with their respective cloud environments. The status information includes operational conditions such as overloaded, unavailable, offline, available, and working properly. The terms 'end-user devices', 'end-user device(s)', and 'end-user device' are used interchangeably throughout this disclosure. Similarly, the terms 'tenants', tenant(s)', and 'tenant' are used interchangeably throughout this disclosure.

In the multi-tenant cloud network, end-user devices 104 communicate within their tenancy and with other tenants' end-user devices to access and share data. Data sharing serves various purposes, such as training, communication, and documentation, and promotes dynamic communication by providing engaging content and supporting version control. Conversely, data sharing across multi-tenant environments poses risks, including potential data security breaches stemming from the embedding of sensitive information in images, files, or other network traffic.

Data sharing that includes sensitive information breaches, such as data concealed in shared content or network traffic, leads to unauthorized access and reputational damage for enterprises. The DLP system 100 mitigates the risk of security breaches by intercepting network traffic at an application layer and computing risk scores for end-user devices 104 communicating within the cloud network. The DLP system 100 detects images embedded with secret messages via steganography and shared across the end-user devices 104. The DLP system 100 further prevents data exfiltration across multiple tenants in the cloud network and infers a presence or an absence of malware payloads hidden in network traffic. The DLP system 100 infers steganographic content and/or steganographic images using a wide variety of steganographic techniques. In an embodiment, the DLP system 100 prevents data exfiltration, detects if steganographic content is embedded in images, and identifies malware payloads in network traffic based on contextual information of the end-user devices 104. In another embodiment, the DLP system 100 factors in the geographical location of the end-user devices 104 to generate an alert regarding data breaches and malware presence.

The DLP system 100 includes the DLP server 108, which functions as middleware to intercept network traffic from the end-user devices 104 at the application layer. The DLP server 108 intercepts network traffic, retrieves the images, and detects steganographic content using a machine learning (ML) engine. The DLP server 108 detects steganographic content and/or malware payloads in network traffic and generates an alert based on multiple policies and the contextual information of the end-user devices 104. In an embodiment, the DLP server 108 applies different policies on the data flowing through the application layer to block, permit, log, quarantine, and/or report the detection of the steganographic content and malware. The DLP server 108 performs contextual analysis and policy enforcement to generate alerts and to stop malicious data exfiltration. In another embodiment, the DLP server 108 integrates with email systems, the service(s) 110, databases, and software as a service (SaaS) application to mitigate data breaches.

Figure 1B:
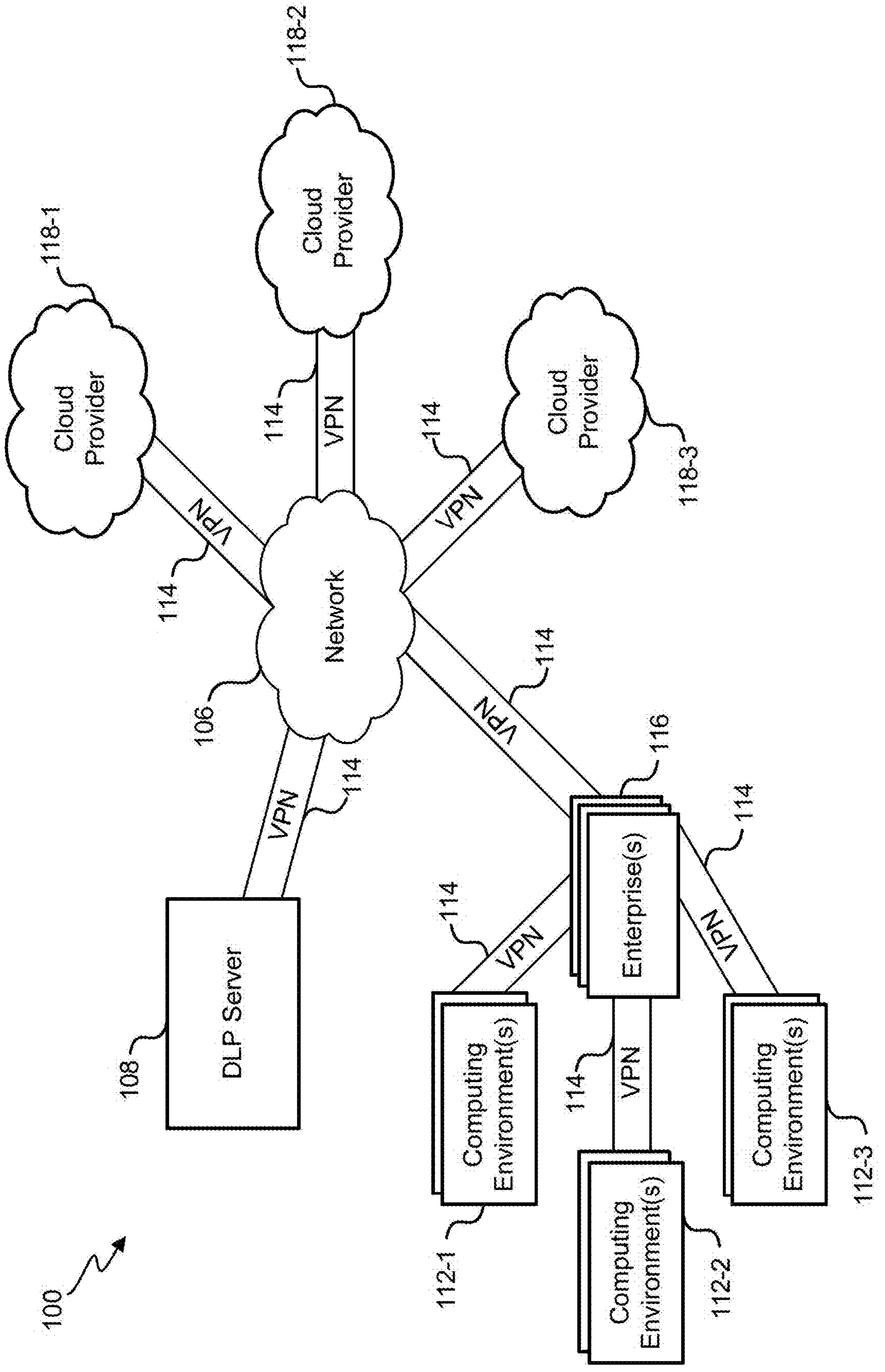
FIG. 1B illustrates a block diagram of an embodiment of the DLP system in the cloud network.

Referring next to FIG. 1B, a block diagram of an embodiment of the DLP system 100 in the cloud network is shown. In an embodiment, the DLP system 100 facilitates communication between private or internal tenants within isolated domains. The DLP system 100 enables the private tenants, isolated in their respective domains, to interact securely within a private cloud network using secure communication capabilities. In another embodiment, the DLP system 100 integrates with third-party applications, external clients, or any other cloud providers to prevent data exfiltration across the tenants 102 in the cloud network.

In an embodiment, the DLP system 100 is a single-tenant private cloud serving internal clients, for example, private clouds offered by Netskope. In another embodiment, the DLP system 100 supports multi-tenancy when external client integration is entailed. The DLP system 100 includes multiple servers and supports multi-tenant systems or enterprise(s) 116 to use the same network while maintaining isolation through domains or other logical separations. Encryption, leased/encrypted tunnels, firewalls, and/or gateways are used to protect data between enterprises.

The DLP system 100 includes computing environment(s) 112-1, 112-2, 112-3, collectively designated as computing environments 112. The computing environments 112 have a domain device(s), dedicated to the computing environments 112 and communicating with their respective enterprise using a virtual private network (VPN) 114 over local area networks (LANs), wide area networks (WANs), and/or the network 106. In place of the VPN 114 as an end-to-end path, tunneling (e.g., Internet Protocol in Internet Protocol (IP-in-IP), Generic Routing Encapsulation (GRE), policy-based routing (PBR), Border Gateway Protocol (BGP)/Interior Gateway Protocol (IGP) route injection, or proxies) can be used. Cloud provider 118-1, 118-2, 118-3, collectively designated as cloud providers 118, offer remote services and utilize public or private cloud infrastructures, including Web/SaaS, Secure Access Service Edge (SASE) gateway, public/private data center, and voice/video connected to the DLP server 108 via the VPN 114. Although three computing environments and the cloud providers 118 are shown, any suitable number of the cloud providers 118 and the computing environments 112 may be provided, some of which may be captive to a particular enterprise or otherwise not accessible to multiple domains.

In an embodiment, the DLP server 108 provides cloud access security broker (CASB) functionality for cloud security to the enterprise(s) 116, with the CASB data flow regulated by a global cloud traffic controller (GCTC). Communication between the DLP server 108 and the cloud providers 118 for a given enterprise can be either a VPN connection or a tunnel, depending on the preference of the respective enterprise. The DLP server 108 configures, tests, and enforces dynamic policies for the end-user devices 104 across the cloud network in the DLP system 100.

Figure 2:
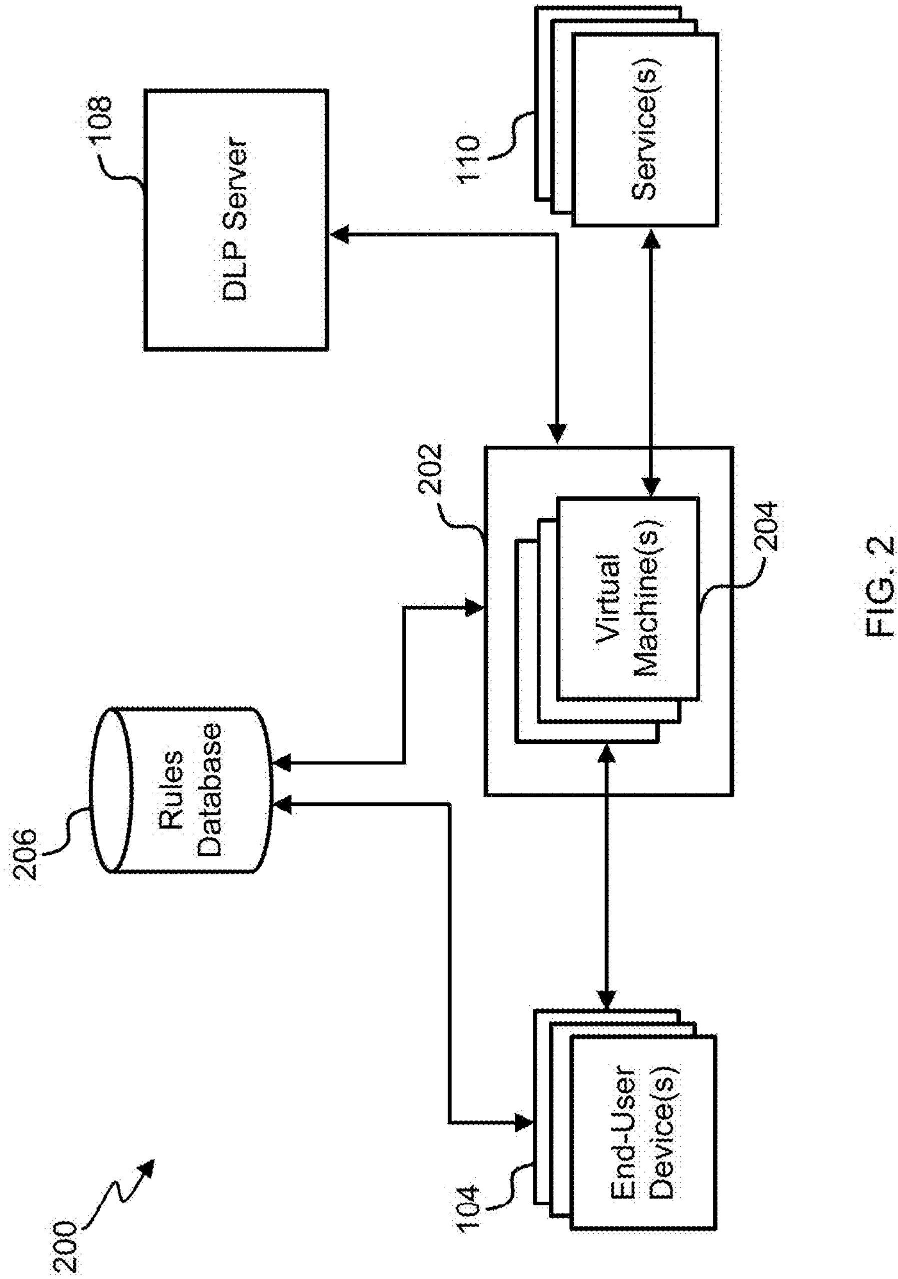
FIG. 2 illustrates a block diagram of a single-tenant DLP system.

Referring next to FIG. 2, a block diagram 200 of a single-tenant DLP system is shown as an embodiment. The end-user devices 104 use virtual machine(s) (VM(s)) 204 running on a hypervisor 202 in the data centre. The end-user devices 104 use the VM(s) 204 to deploy and use the service(s) 110. Tenant-specific rules and policies are configured for the end-user device(s) 104 and stored in the rules database 206. The rules database 206 maintains configuration rules and policies for tenants 102, including access control rules, configuration settings, security policies, compliance rules, and/or patch policies. The DLP server 108 infers the presence or absence of malicious data, steganographic content, and malware in the network traffic. The DLP server 108 further detects the data breaches based on the contextual information of the end-user devices 104 and the policies of the enterprise(s) 116 in the DLP system 100.

Figure 3A:
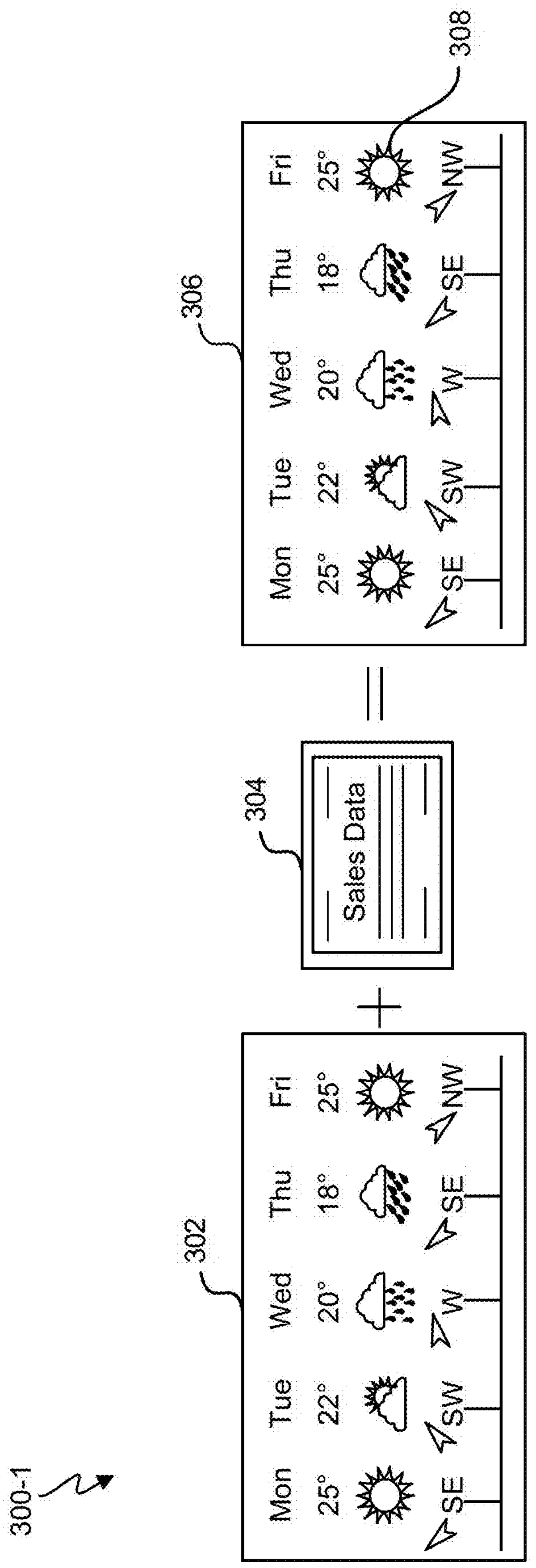
FIG. 3A illustrates an embedding of a secret message in a snapshot.

Referring next to FIG. 3A, an embedding 300-1 of a secret message 304 in a snapshot 302 is shown as an embodiment. The embedding 300-1 of the secret message 304 involves inserting sensitive/confidential information into files, such as an image or a document, using steganographic techniques. Steganography hides data, including both malicious and/or sensitive data, inside a digital image or a payload. Steganography exfiltrates sensitive data and carries the malware payload through network traffic shared across the end-user devices 104 in the cloud network. The availability of off-the-shelf steganography tools means that virtually no technical expertise is required to hide data. Additionally, many off-the-shelf tools encrypt the secret message 304 before steganographic embedding into the files, thereby further complicating detection. Steganography embeds the secret message 304, or the malware, into the snapshot 302 so that the snapshot 302 remains visually identical to the original image at the receiving end-user device. In an embodiment, the snapshot 302 represents any image or network traffic that is shared across the cloud network.

The snapshot 302 (or any other image) contains two sections: a header data and an image data. Along with these sections, the snapshot 302 (or the image) also includes a start of image (SOI) marker and an end of image (EOI) marker. The header data includes metadata about the image, such as the image creation time, the image author, the image resolution, and/or the image size. The image data contains pixel values and other data that form the objects, edges, colours, or other visuals and information that the image represents. Steganography hides the secret message 304 after the EOI marker, in the header data, or in the image data, and no standard application will see anything out of the ordinary. One off-the-shelf tool is the Least Significant Bit (LSB). The digital image is composed of pixels and has the image resolution of W*H with W pixels wide and H pixels high. For color images, every single pixel has three color channels (e.g., red, green, blue (RGB)). A single-color channel is usually 8 bits. In the LSB steganographic technique, the least significant bits of the color channels of the snapshot 302 are overwritten with bits from the secret message 304. The secret message 304 is converted into bits. As long as the bits size of the secret message 304 are less than the total number of LSBs of the snapshot 302, the embedding 300-1 of the secret message 304 does not change the visual appearance of the snapshot 302 in a perceptual way. This is especially true in real scenarios where an original, unaltered image is unavailable. As long as the secret message 304 fits within the LSBs, any type of data (encrypted or unencrypted) can be hidden, including sensitive images, documents, and malware. Several implementations of the LSB entail an output image 306 to be uncompressed, as lossy compression methods, by construction, delete or alter the LSBs of the image. For example, an uncompressed high definition (HD) image contains 1980*1020*3*8~7 MB of image information, thus leaving ~700 kB of space for the secret message 304 using the LSB technique.

In an embodiment, the secret message 304, such as confidential sales data of the enterprise(s) 116, is embedded into the snapshot 302 using steganographic techniques, such as the LSB or a Palette-Based technique. The output image 306 shows no clear signs, and when opened with a normal viewer, it behaves as expected. The output image 306 displays coherent visual content with no errors, glitches, or anomalies. In another embodiment, when the size of the snapshot 302 and the secret message 304 do not align as per the targeted steganographic technique, the output image 306 includes a minor glitch 308 that can go unnoticed to the naked eye.

Figure 3B:
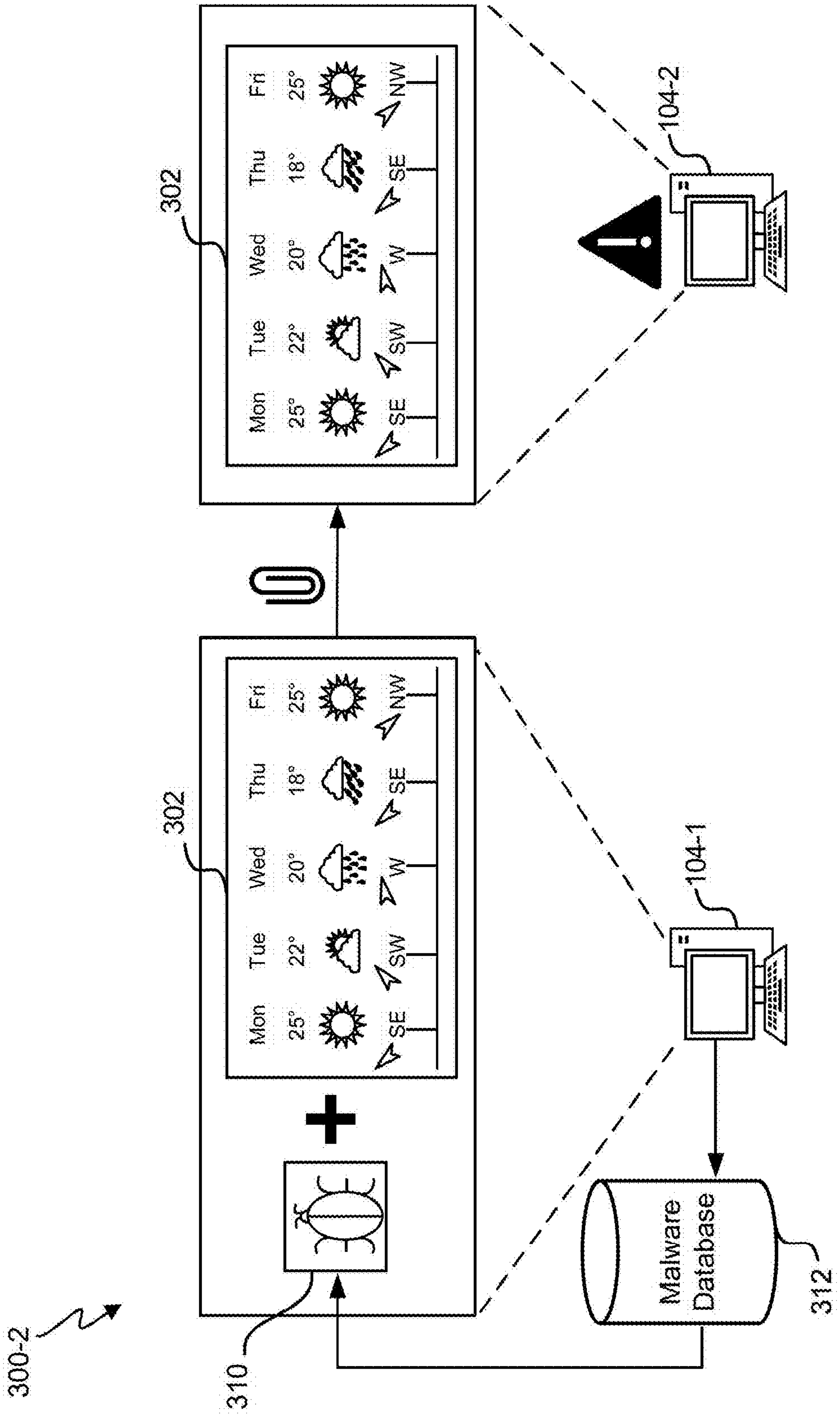
FIG. 3B illustrates another embedding of a malware payload in network traffic.

Referring to FIG. 3B, another embedding 300-2 of a malware payload in the network traffic is shown as an embodiment. The malware payload includes an unencrypted malware 310 from a malware database 312. The malware database 312 contains malware payloads as unencrypted malware binaries that a malicious actor (here, for example, a first end-user device 104-1) accesses and manipulates without additional decryption steps. The first end-user device 104-1 retrieves the unencrypted malware 310 from the malware database 312 and conceals it within the snapshot 302 or within network traffic, such as packet payloads. The first end-user device 104-1 conceals the unencrypted malware 310 without altering the functional or visual characteristics of the snapshot 302. The snapshot 302, embedded within the malware payload's executable, appears harmless to both administrators and security tools. After embedding the malware, the first end-user device 104-1 transmits the snapshot 302 or the packet payloads to a second end-user device 104-2 via common channels within the cloud network, such as email attachments, social media, or application programming interface (API) requests.

When the second end-user device 104-2 opens the snapshot 302 or processes the network traffic, the malware payload gets executed. The malware payload exploits privileges by installing rootkits, creating backdoors, or granting the first end-user device 104-1 long-term control over the compromised second end-user device. In an embodiment, the network traffic carrying the malware payload is shared among the tenants' collaborative environments, such as dashboards or shared repositories. This infected network traffic leads to supply chain attacks and compromises the end-user devices 104 across multi-tenant systems or enterprise(s) 116. The DLP server 108 intercepts network traffic from end-user devices 104 at the application layer and prevents data exfiltration across the tenants 102. The DLP server 108 analyses the contextual information of the end-user devices 104 to generate alerts when the images containing steganographic content and/or network traffic carrying a malware payload are detected.

Figure 4:
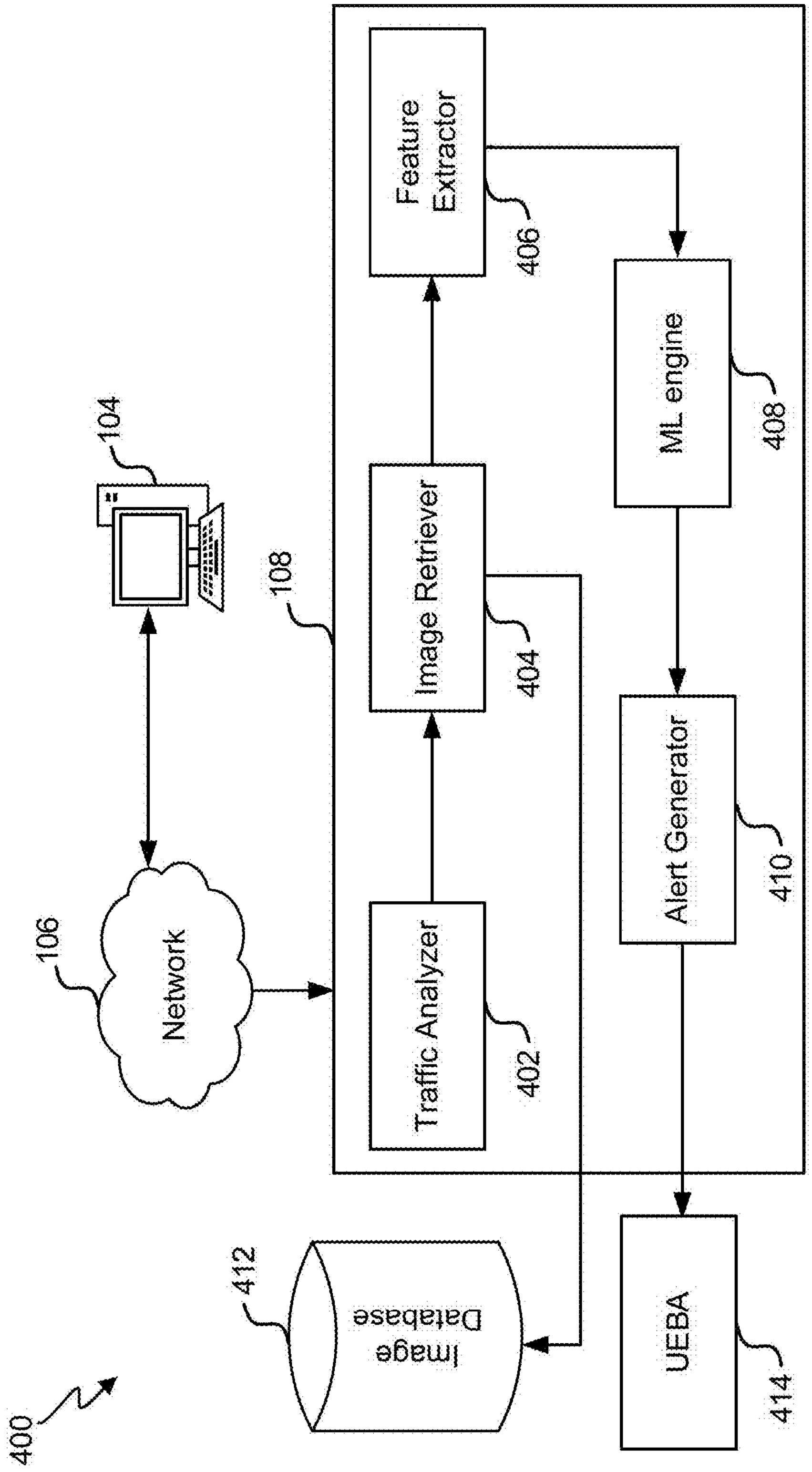
FIG. 4 illustrates a configuration of a DLP server in the cloud network.

Referring next to FIG. 4, a configuration 400 of the DLP server 108 in the cloud network is shown as an embodiment. The configuration 400 includes the network 106, the end-user device 104, the DLP server 108 functioning as the middleware, an image database 412, and a user entity behavior analyzer (UEBA) 414. The DLP server 108 includes a traffic analyzer 402, an image retriever 404, a feature extractor 406, an ML engine 408, and an alert generator 410.

The DLP server 108 implements policies to manage different interactions and activities across the end-user devices 104. DLP solutions typically apply pre-configured rules or policies based on various regulations, such as the Health Insurance Portability and Accountability Act (HIPAA) or the General Data Protection Regulation (GDPR). To administer the policies, the DLP server 108 prevents and monitors outgoing channels (like email and web chat) and provides options for handling potential security breaches. For instance, when an employee is about to send an email with sensitive data embedded in a harmless-looking cat image, the DLP server 108 might block the email entirely based on a risk score or redirect it to an administrator. The response is based on customized rules or tenant-specific policies established by the enterprise(s) 116.

The DLP server 108 functions as the middleware to intercept the network traffic. The network traffic includes the files and attachments that the end-user device 104 transmits across the tenants 102 over the protocols. Examples of the protocols include, but are not limited to, HyperText Transfer Protocol (HTTP), HyperText Transfer Protocol Secure (HTTPS), Simple Mail Transfer Protocol (SMTP), and File Transfer Protocol (FTP). The DLP server 108 intercepts these files and extracts image content. In cases where the network traffic is encrypted, the enterprise(s) 116 use Secure Socket Layer (SSL) or Transport Layer Security (TLS), so the DLP server 108 intercepts the network traffic to inspect the contents of the communications. The DLP server 108 prevents the exfiltration of sensitive data. Sensitive data may include confidential, internal, public, personally identifiable information (PII), financial data, regulated data, intellectual property, and more.

In an embodiment, the DLP server 108 is a network DLP that integrates with secure web gateways (SWG) or email gateways to intercept network traffic routing through gateways, firewalls, and/or proxies. In another embodiment, the DLP server 108 is a cloud DLP that connects via CASB or SaaS APIs to intercept data stored in the end-user devices 104 of a first tenant 102-1. The DLP server 108 scans the stored data in file servers, Slack, shared repositories, and/or drives. In another embodiment, the DLP server 108 hooks into Operating System (OS)-level APIs, such as the clipboard and file systems running on the end-user devices 104 of the first tenant 102-1, and intercepts actions, such as copy/paste, uploads, downloads, and/or file writes.

The DLP server 108 intercepts the network traffic and extracts the images. The traffic analyzer 402 performs deep packet inspection (DPI), examining the entire payload of network traffic rather than just the headers. The traffic analyzer 402 identifies the files or data being shared across the end-user devices 104 and differentiates among them by unpacking container formats, such as .zip files. The traffic analyzer 402 intercepts network traffic and analyzes file signatures and metadata to differentiate between text documents, spreadsheets, and other media files. The image retriever 404 extracts the images from the network traffic intercepted by the traffic analyzer 402. The images appear in multiple contexts in the network traffic. For example, a standalone image shared via the FTP, the image shared through the SMTP in the attachment, or the image uploaded over HTTPS in the shared repository of the enterprise(s) 116 by the end-user device 104. The DLP server 108 stores the retrieved images in the image database 412.

Once the image retriever 404 extracts the image from the network traffic, the feature extractor 406 identifies and extracts multiple features from the image. The feature extractor 406 performs both pixel-level and file-level computations to extract features. The features include a pixel color chi-squared ($\chi^2$), an image type, and an image entropy. The features further include a byte-wise mean, a byte-wise chi-squared ($\chi^2$), a serial correlation coefficient, a Pi (Π) Monte-Carlo value, a standard deviation (SD) in a channel entropy, and a spatial pair analysis (SPA) score. In an embodiment, the feature extractor 406 prioritizes the pixel color $\chi^2$ which is the goodness-of-fit across the color channels. The pixel color $\chi^2$ exploits the fact that a random sampling of pairs of pixel values has the same average expected value in both the original image and the image altered by hiding the steganographic content. This is because modifying the least significant bit is equivalent to swapping the pixel values inside a pair. For this reason, the $\chi^2$ can be calculated between a random sample of the average of a sum of pairs and the actual distribution of even- or odd-pixel channels. The larger the $\chi^2$ is, the more likely it is that the image contains a hidden message.

The image entropy measures the disorder in pixel intensities. The image entropy is high for the images embedded with the steganographic content, noise, or texture. The feature extractor 406 further identifies the image type, such as Portable Network Graphics (PNG), Joint Photographic Experts Group (JPEG), or bitmap (BMP), by inspecting the image header's magic numbers. For example, for a PNG and a JPEG image, the magic number appears in hex characters as 89504E470D0A1A0A and FFD8FF, respectively. The feature extractor 406 computes the total bytes in the image file to extract a file size feature by reading filesystem metadata, and the byte-wise mean by averaging byte values. The feature extractor 406 further computes the byte-wise $\chi^2$ statistic, which represents the deviation of byte value frequencies from a reference. For the serial correlation coefficients, the feature extractor 406 measures linear dependencies between adjacent bytes. For the π Monte Carlo value, the feature extractor 406 measures a randomness-based Monte Carlo estimate of. The feature extractor 406 maps byte pairs to points in unit square and uses an inside-circle ratio to estimate π.

To compute the SD in the channel entropy, the feature extractor 406 partitions image channels into local regions and computes local entropies for local regions. The feature extractor 406 measures the SD in the local entropies. As the embedding of the steganographic content flattens statistical structure of the image, the SD in the channel entropy captures this flattening. For the SPA score, the feature extractor 406 classifies adjacent pixel pairs of the image into complementary categories based on LSB parity and relative ordering. For example, $O_X$ as observed number of pixel pairs in category $X_{2m+1}$ and $O_Y$ as observed number of the pixel pairs in category $Y_{2m+1}$. For natural images under no embedding, the pixel pairs have approximately equal expected count and the difference between their observed population is close to zero. The LSB embedding alters pixel values. The LSB embedding increases the difference between observed counts of pair categories. This difference increases proportionally to an embedding rate (approximately linearly or quadratically). The feature extractor 406 quantifies this effect as the SPA score by computing a normalized divergence in count of the pixel pairs as $\Delta=|O_X-O_Y|/|O_X+O_Y|$.

In an embodiment, the feature extractor 406 constructs frequency histograms over discrete bins to derive statistics for both pixel-level and file-level features. In another embodiment, the feature extractor 406 uses one-pass accumulation to avoid extra memory allocation/reservation. The feature extractor 406 identifies and computes the byte-wise mean and serial correlation coefficients, while avoiding storing whole sequences beyond a particular buffer size. In yet another embodiment, the feature extractor 406 uses image decoders to derive the pixel-level features. The DLP server 108 assigns a priority to the features based on an associated memory footprint.

Once the features are extracted, the DLP server 108 uses the feature vectors to infer, via the ML engine 408, the presence or absence of the steganographic content in the image. The ML engine 408 includes multiple ML classifiers. The inference of the steganographic content in the image, based on extracted features, outputs a risk score. As the steganography involves subtle changes, absolute deduction is rare to output by the ML classifiers. For instance, the digital image exhibits some noise levels that look like steganographic content. Additionally, compression artifacts also mimic hidden patterns. For this reason, ML classifiers output the risk scores. The risk score indicates the probability of the steganographic content and/or the malware payload in the network traffic. In an embodiment, the ML classifier includes pre-trained classifiers based on the policies of the enterprise(s) 116. In another embodiment, the ML classifiers include customized classifiers tailored to a tenant-specific policy for a single tenant or a single enterprise. The customized classifiers assist the enterprise(s) 116 in identifying key objects in the data or content shared across the tenants 102. The key objects of data can be financial data or rarefied number combination.

The DLP server 108 computes the risk score for the end-user device 104 based on the steganographic content detected in the image/network traffic. The DLP server 108 compares the risk score against a primary threshold and increments a risk count when the risk score exceeds the primary threshold. The DLP server 108 further analyzes the contextual information of the end-user device 104, via the alert generator 410. The contextual information includes a device identifier (ID), session details, profile data, behavioural data, and/or metadata of the end-user device 104. Based on the contextual information, the alert generator 410 compares the risk count against a secondary threshold and generates the alert when the risk count exceeds the secondary threshold, in accordance with multiple policies. The alert indicates the presence of the steganographic content or the malware payload in the network traffic. The DLP server 108 analyses the contextual information and generates the alert based on the detection of the hidden message or steganographic content in the image and/or the network traffic carrying the malware payload. The malware payload includes the unencrypted malware 310 from the malware database 312.

In an embodiment, the alert generator 410 further generates a report of user behavior or actions for the UEBA 414. The alert or the report is routed to the UEBA 414 to create a baseline of user behavior patterns. The UEBA 414 scans user activity history and collects behavioral information from multiple sensors/endpoints across the enterprise(s) 116. The UEBA 414 processes this information in accordance with the policies defined for the tenant 102, the enterprise(s) 116, and/or the end-user device 104. The UEBA 414, based on the risk scores and risk counts, generates behavioral intelligence and a baseline for user activity within the multi-tenant environment or enterprise(s) 116. In an embodiment, the UEBA 414 uses ML algorithms to construct the baseline for user activities and patterns within the tenant 102. The ML algorithms are trained on historical patterns of user behavior and historical logs. When the end-user device 104 exhibits anomalous behavior, such as a data breach, with a particular frequency and for a period of time, the UEBA 414 queries the enterprise(s) 116 for further investigation.

Figure 5:
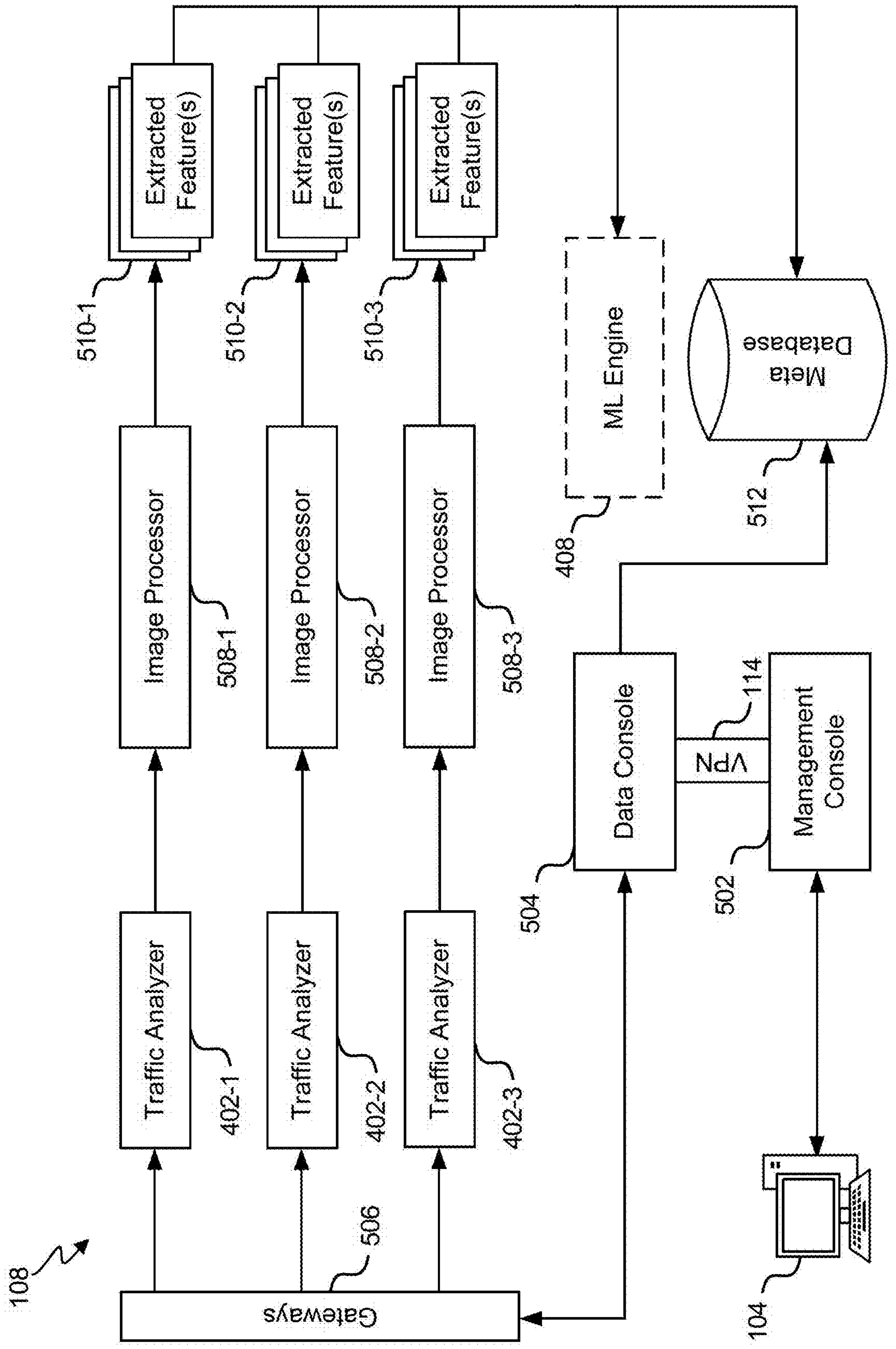
FIG. 5 illustrates a block diagram of an embodiment of the DLP server to retrieve images from the network traffic.

Referring next to FIG. 5, a block diagram of an embodiment of the DLP server 108 to retrieve images from the network traffic is shown. The DLP server 108 includes a management console 502, a data console 504, gateways 506, and traffic analyzers 402-1, 402-2, 402-3, collectively designated as the traffic analyzer 402. The DLP server 108 to retrieve the images from the network traffic further includes image processors 508-1, 508-2, 508-3, collectively designated as image processor 508, extracted feature(s) 510-1, 510-2, 510-3, collectively designated as extracted feature(s) 510, and a meta database 512. The terms 'extracted feature', 'extracted feature(s)', and 'extracted features' are used interchangeably throughout this disclosure.

The gateways 506 in the DLP server 108 monitor, control, and secure the flow of sensitive content within the enterprise(s) 116. The gateways 506 serve as entry points for data entering or leaving the network 106, allowing administrators to enforce policies and prevent unauthorized file sharing and data transfers. Examples of the gateways 506 on the DLP server 108 include dedicated DLP appliances or software solutions that integrate with the network infrastructure. Some popular vendors providing DLP gateways include Symantec, McAfee, Forcepoint, and Digital Guardian. Examples of the gateways 506 technologies provided by these vendors include Enterprise Data Loss Prevention (EDLP), PHX (ProxySG), etc.

The management console 502 is connected to the data console 504 via a secured tunnel, i.e., the VPN 114. In an embodiment, the management console 502 monitors and controls the full structure of the DLP server 108. The management console 502 provides introspection, controls email traffic, balances load, and oversees DLP services and cache lookups. The data console 504 works with the gateways 506 to enforce policies and inspect network traffic. The data console 504 handles the transmission, reception, and forwarding of data packets while adhering to predefined policies and rules. The data console 504 further provides traffic filtering, load balancing, and data flow acceleration and optimization. The data console 504 manages the metadata database 512 or temporary databases, e.g., Redis, to store the policies belonging to a user from one tenant, separate from other users. The data console 504 also stores the key data objects for the enterprise(s) 116.

After the traffic analyzer 402 differentiates the files by unpacking the container formats, the image processor 508 retrieves the images and begins extracting features. In an embodiment, the image processor 508 parses the files to retrieve the images. In another embodiment, the image processor 508 retrieves standalone images uploaded or attached to a chat/email. The image processor 508 decodes image binaries and isolates image formats, such as JPEG, PNG, or BMP, based on the policies of the enterprise(s) 116 and tenant-specific rules. The image processor 508 compares the image hash against known sensitive templates to determine whether the image itself contains sensitive or confidential data that the enterprise(s) 116 disallows sharing. The image processor 508 retrieves images from network traffic and identifies image features, such as image entropy, pixel color $\chi^2$, and image type. The features are stored as the extracted feature(s) 510 in the meta database 512. The DLP server 108 assigns priority to features based on their associated memory footprint. The extracted feature(s) 510 are fed to the ML engine 408 to infer the steganographic content in the images and to compute the risk score for the end-user device 104.

Figure 6:
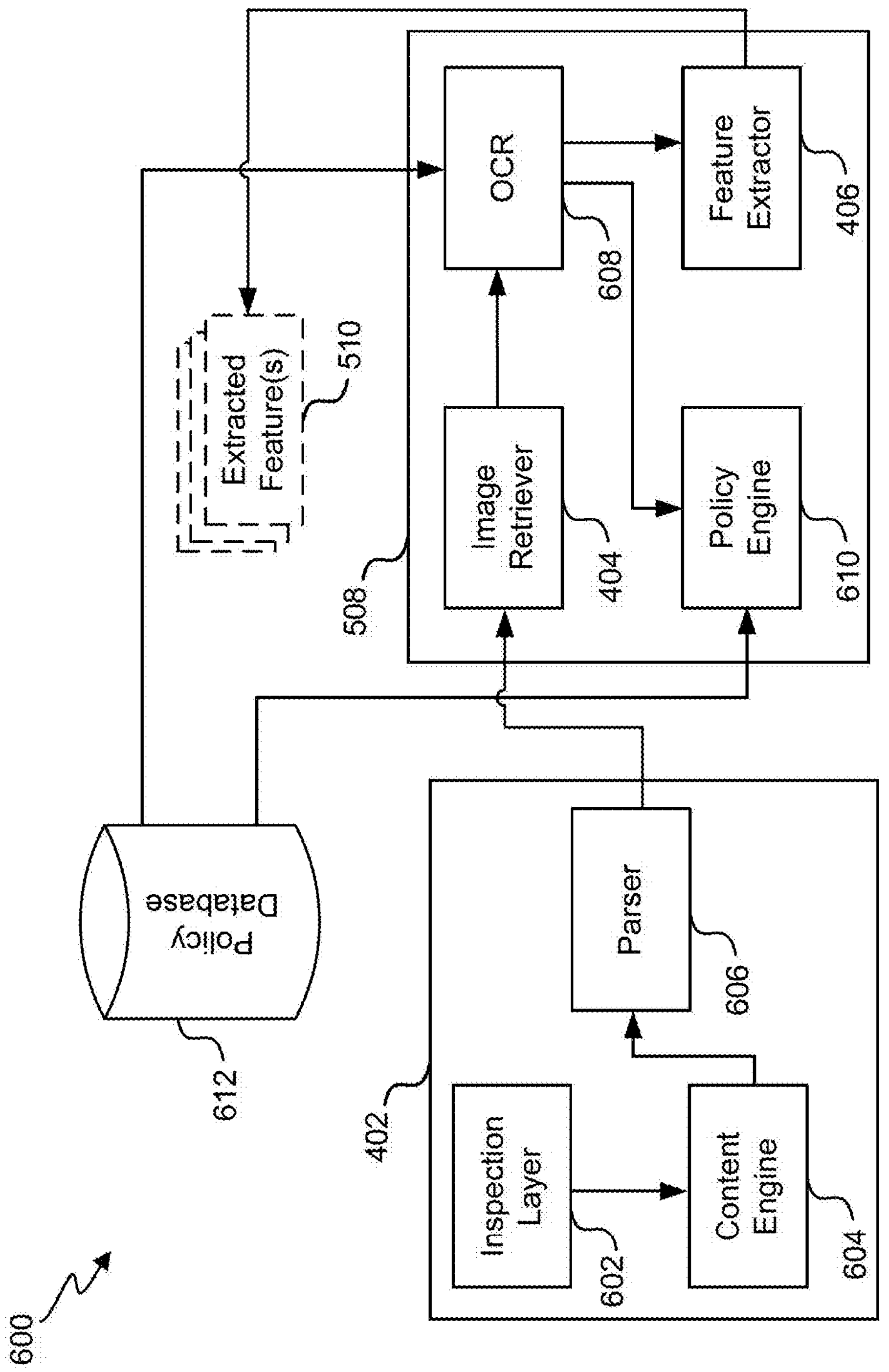
FIG. 6 illustrates image processing to inspect the network traffic and extract features from images via an image processor of the DLP server.

Referring next to FIG. 6, image processing 600 to inspect the network traffic and extract features from the images via the image processor 508 of the DLP server 108 is shown as an embodiment. The image processing 600 includes a policy database 612, the traffic analyzer 402, the image processor 508, and extracted feature(s) 510. The traffic analyzer 402 consists of an inspection layer 602, a content engine 604, and a parser 606. The image processor 508 includes the image retriever 404, an object character recognizer (OCR) 608, a policy engine 610, and the feature extractor 406.

The inspection layer 602 monitors the network traffic at the application layer and/or data before it leaves the enterprise(s) 116. In an embodiment, the inspection layer 602 uses the Internet Content Adaptation Protocol (ICAP) or custom plugins to integrate with the gateways 506, such as proxies and SWGs. The inspection layer 602 monitors the network traffic via HTTPS, HTTP, and/or SMTP. In another embodiment, the inspection layer 602 uses representational state transfer (REST) APIs to connect via CASB or SaaS connectors. The inspection layer 602 monitors user activities, such as uploads, downloads, store, and shares, within the tenant environment. The content engine 604 collects raw data after the inspection of the network traffic completes. The content engine 604 collects SMTP, HTTP, HTTPS streams, file downloads, file uploads, local file systems, or memory states, and manages TLS/SSL decryption via proxy certificates, generating many formats of the raw data/file streams.

The parser 606 identifies file types from the file streams by using magic numbers and/or Multipurpose Internet Mail Extensions (MIME) headers. The parser 606 prepares structured content for image retrieval from the file streams. The image retriever 404 identifies the images from parsed/ structured content and decodes the image binaries the OCR 608 extracts readable text from the retrieved images, providing an additional security layer. By extracting readable text, the OCR 608 determines whether the images contain confidential information through pattern matching and/or fingerprinting. Along with the OCR 608, the policy engine 610 evaluates the images to confirm whether the content shared among the end-user devices 104 violates the policies of the enterprise(s) 116, stored in the policy database 612. The policy engine 610 evaluates the channel (e.g., email or web) and identifies the sensitivity labels and the destination. Based on the evaluation, the policy engine 610 executes decisions, such as allow, block, or quarantine. The policy engine 610 further communicates ICAP responses to gateways 506, makes a SaaS API call, logs actions, and sends reports to the UEBA 414. The images, retrieved from the network traffic, are finally forwarded to the feature extractor 406 to identify features and infer, via the ML engine 408, whether the steganographic content or the malware payloads are hidden in the images.

Figure 7:
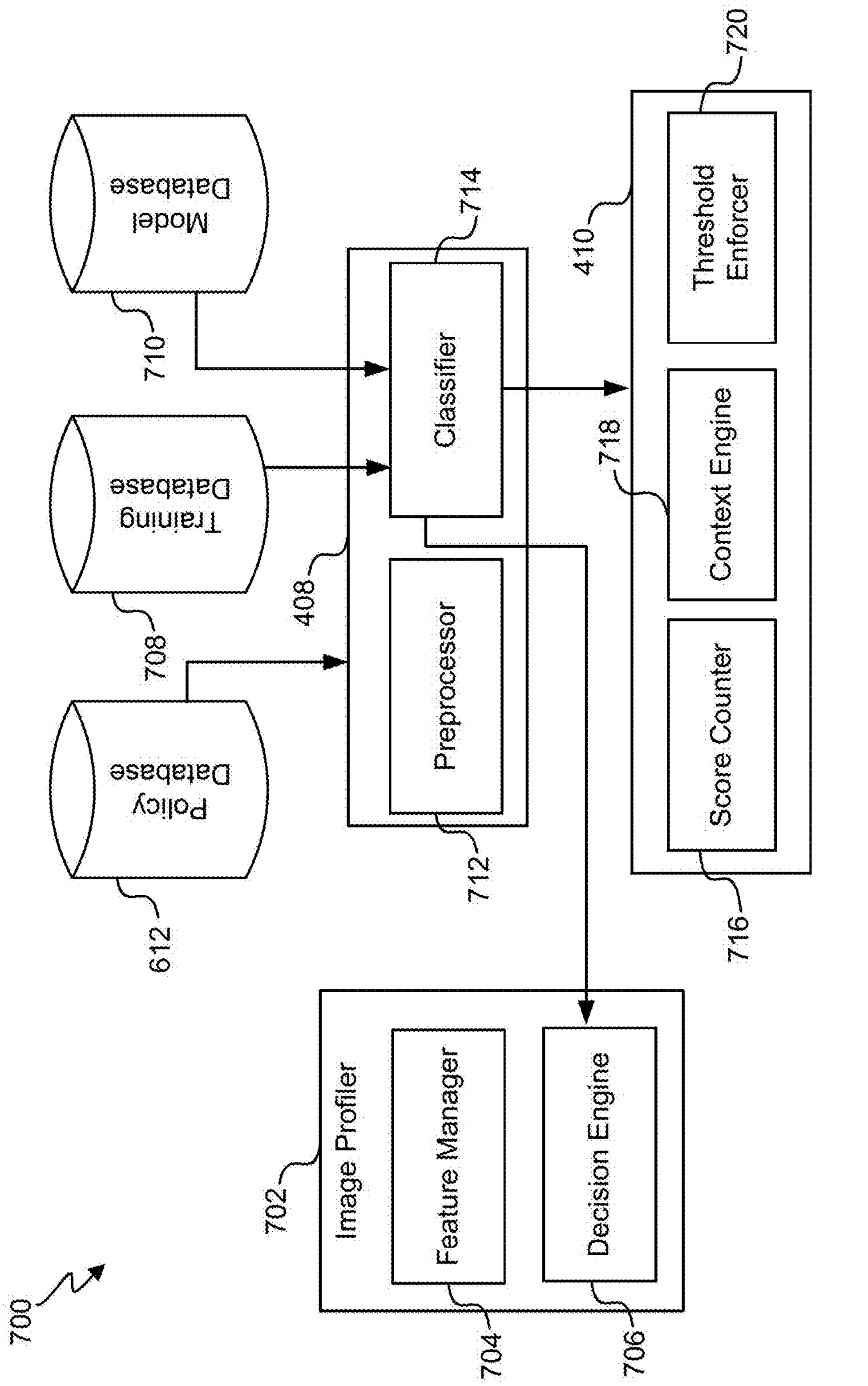
FIG. 7 illustrates a process of alert generation based on a threshold comparison and a risk score for an end-user device.

Referring next to FIG. 7, an embodiment of a process 700 for alert generation based on a threshold comparison and the risk score for the end-user device 104 is shown. The process 700 for the alert generation includes an image profiler 702, the policy database 612, a training database 708, a model database 710, the ML engine 408, and the alert generator 410. The image profiler 702 includes a feature manager 704 and a decision engine 706. The ML engine 408 includes a preprocessor 712 and a classifier 714. The alert generator 410 includes a score counter 716, a context engine 718, and a threshold enforcer 720.

The image profiler 702 prioritizes the features extracted via the feature extractor 406 based on their associated memory footprint. In an embodiment, the image profiler 702 prioritizes the features based on their usefulness for particular datasets. The image profiler 702 detects image characteristics of images retrieved from network traffic. Image characteristics include image resolution, color depth, and/or image format. Based on the image characteristics, the image profiler 702 identifies the type of dataset, for example, natural images, snippets, document screenshots, or scans. The feature manager 704 maintains a list of features, including the pixel color $\chi^2$, the image type, and the image entropy. The features further include the byte-wise mean, the byte-wise chi-squared $\chi^2$, a serial correlation coefficient, the $\pi$ Monte-Carlo value, the SD in the channel entropy, and the SPA score. Against every single feature from the list, the feature manager 704 estimates and stores a memory footprint, a cost in terms of time and complexity, and a feature score. The feature score indicates the usefulness of the features. For initial processing, the feature score is based on heuristics. For later processing, the feature manager 704, in some examples, uses a learned feature score. In an embodiment, the enterprise(s) 116 grant the DLP system 100 access to private datasets or internal user activities at the cloud network. The DLP system 100, via the image profiler 702, estimates feature scores to determine which features carry more weight for the particular dataset.

The decision engine 706 applies a selection policy to the features based on the image data type of the transmitted images for detecting steganographic content or embedded malware. In an embodiment, the DLP server 108 assigns priorities to the features based on their associated memory footprints, sorts the features by the feature score, and selects the features until the memory limit or the time and complexity cost is reached. In another embodiment, the DLP server 108 assigns the priority to the features based on a pre-defined policy.

The ML engine 408 includes the ML classifiers. The ML classifiers are either pre-trained or customized. In an embodiment, the ML engine 408 includes the feature extractor 406, the preprocessor 712, and the classifier 714. In another embodiment, the ML engine 408 executes the ML algorithms used by the UEBA 414. The ML engine 408 extracts the ML algorithms from the model database 710 based on baseline creation and user activities. The preprocessor 712 normalizes the color channels, scales the pixel values, and standardizes the images based on mean and deviation. To match model constraints selected from the model database 710, the preprocessor 712 adjusts image layouts, such as W*H*C Vs. C*H*W.

In an embodiment, the classifier 714 selects customized classifiers from the model database 710 based on the tenant-specific policy or the rules of the enterprise(s) 116 stored in the policy database 612. In another embodiment, the classifier 714 contains pre-trained classifiers and selects the suitable classifier from the model database 710. The training database 708 stores the training datasets for the classifier 714. In an embodiment, the classifier 714 is a random forest classifier that generates the risk scores by averaging predictions from the trees. In another embodiment, the classifier 714 is a logistic regression model that outputs the risk scores through the sigmoid function. Examples of the classifier 714 include, but are not limited to, naïve Bayes, gradient boosting (such as XGBoost or LightGBM), neural networks using softmax or sigmoid functions, and support vector machines (SVMs) using Platt scaling.

During deployment of the DLP system 100, the classifier 714 is trained and tested using steganography tools. The examples of the steganography tools that are used for training and testing include, but are not limited to, cloacked_pixel (sic), openstego, stegano, stegano sieve, steghide, sealed, and outguess. These steganography tools use methods such as Vanilla LSB, random LSB, graph-theoretic methods that preserve pixel statistics, and JPEG cosine LSB. Several of the mentioned tools use the Vanilla LSB method. The openstego and stegano sieve also use LSBs but randomize the order of the hidden LSBs. Steghide uses a proprietary graphical-theoretic method that attempts to preserve pixel statistics. The outguess uses LSB, but not the pixel LSB. Alternatively, the outguess tool uses the least significant digits of the cosine coefficients from JPEG images.

In an embodiment, during deployment of the DLP server 108, to evaluate various alerts and detection criteria for steganography and to derive appropriate policy definitions, a total of 100 tenants are onboarded for a minimum duration of 30 days. Contextual attributes of the users, such as their roles, departments, upload/download patterns, internal versus external activities, and geographic factors, are analysed. The contextual attributes/contextual information are correlated with the alerts, along with contextual details of the user transactions that initiated the steganography detection. An additional consideration is the access level of the end-user device 104 to confidential information.

In an embodiment, during deployment of the DLP server 108, 40k files are used, with a 65% train-test split, to train and test the ML engine 408. Carrier images are taken from a private DLP image training set. Steganographic images are generated using steganography tools, producing ~2k unencrypted images, ~2k encrypted images, and 750 unencrypted malware samples for the malware database 312. The steganographic images are further generated using a distribution of available steganography tools. For example, 31% cloacked_pixel (sic), 31% openstego, 28% stegano, 5.5% stegano sieve, 2.5% steghide, and 1.1% outguess. Several of the images were regenerated using LSB methods because the other methods have stricter constraints on the type of messages that can be hidden. The LSB methods can hide secret messages up to ~12% of the image size. Steghide and outguess use proprietary algorithms, whereas other methods (steghide, outguess) work with small secret message sizes, i.e., up to ~3% of the image size. For this reason, steghide and outguess are less likely to be used. Furthermore, the steganographic images are generated using ~1.8k JPEG files from VirusTotal and ~33k negative examples (images devoid of any steganographic content/hidden messages).

In an embodiment, the steganographic images are generated using LSB-SEQ (sequential) replacement method. Synthetic EU/US driving license images are concealed in image files without any overlap in the images used for generating training and testing sets (training set: 550 images; testing set: 242 images). The steganographic images are further created by concealing large language model (LLM) generated synthetic personal information (PI) text data of random sizes in the image files, with 550 images in the training set and 250 images in the testing set. The steganographic images are further generated by concealing random texts in the image files using random replacement method (training set: 200 images; testing set: 50 images). For the image files having text prints, positive samples of the steganographic images are created by concealing random varying text in the image files while plain images of the text prints are used as negative samples (training set: 2000 images; testing set: 637 images). Furthermore, hundreds of positive samples of the steganographic images are generated using greyscale cover images with concealed data (training set: 1000 images; testing set: 176 images).

In an embodiment, during implementation of the DLP server 108, to test false positives, the ML engine 408 is evaluated on over 140k image files from the private DLP image training dataset, which contains no steganographic images. 0.19% of these images triggered a false positive from the steganography detection model. In an embodiment, the DLP server 108 detects the malware payload embedded in network traffic with 99% precision and 99% recall. In another embodiment, the DLP server 108 infers the encrypted images embedded as steganographic content with 100% precision and 100% recall. In yet another embodiment, the DLP server 108 infers unencrypted images embedded as steganographic content with 99% precision and 100% recall. The DLP server 108 further infers hidden text embedded as the steganographic content in the images, with an average precision (AP) of 97%. The DLP server 108 infers 73% of the steganographic images with 99% precision on training and testing data. The pixel color $\chi^2$ is a computationally expensive feature in terms of time, complexity, and the memory footprint. In an embodiment, after converting pixel color $\chi^2$ to C++, the DLP server 108 takes ~200 ms to run on a single central processing unit (CPU) in an interactive machine on Socket AM2.

In an embodiment, the classifier 714 provides detection outcomes as feedback to the decision engine 706 to measure a feature contribution after training or validation. The decision engine 706 then updates the feature score using reinforcement learning or bandit-based approaches. The DLP server 108 generates the alert for the UEBA 414. The DLP server 108 computes, via the classifier 714, the risk score for the end-user device 104. The classifier 714 outputs the risk score indicating the probability that the network traffic contains steganographic content or a malware payload. The threshold enforcer 720 of the alert generator 410 compares the risk score against the primary threshold. For example, a risk score below or around 85% may indicate that steganographic detection is triggered by noise or a particular image texture, and further investigation is not warranted. A risk score exceeding the primary threshold indicates the presence of the steganographic content in the media/images/files shared by the end-user device 104. When the risk score exceeds the primary threshold for the end-user device 104, the score counter 716 increments the score count. The score count indicates the frequency or number of attempts the end-user device 104 has made to either send sensitive information out of the enterprise(s) 116 or to embed the malware payloads in the network traffic.

The threshold enforcer 720 compares the risk count against the secondary threshold and generates the alert, based on the policies, when the risk count exceeds the secondary threshold. The DLP server 108 analyzes the contextual information of the end-user device 104 at the application layer via the context engine 718. The contextual information includes the device identifier (ID), session details, profile data, behavioral data, and metadata of the end-user device 104. The application layer applies policies and enforces role-based access control (RBAC) based on user attributes and the context of the end-user device 104. The context engine 718 accesses session metadata, tokens, ID providers (IdPs), active directory, or Single Sign-On (SSO) to fetch the contextual information. The context engine 718 retrieves user IDs, names, email addresses, session tokens, authorization attributes, including user roles and privilege levels, access permissions, job titles, geographical locations, user activity within the tenant 102, IP addresses, and/or device IDs. In an embodiment, the context engine 718 refers to the policy database 612 to analyze if the end-user device 104, which has caused the alert, is authorized to share sensitive information as the steganographic content embedded in the images. The alert generator 410 further generates an event report for the UEBA 414.

Figure 8:
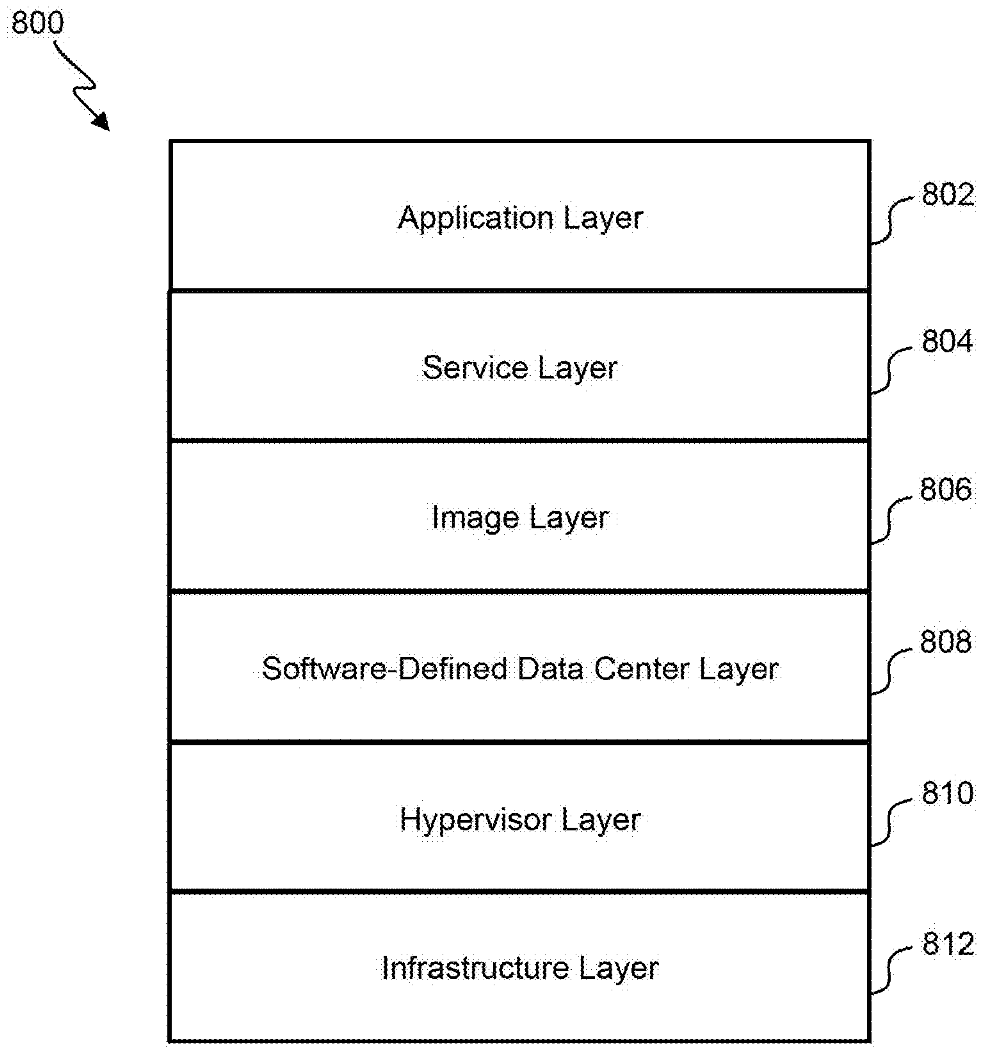
FIG. 8 illustrates a block diagram of an Open-Systems Interconnection (OSI) model.

Referring next to FIG. 8, a block diagram of an Open-Systems Interconnection (OSI) model 800 is shown as an embodiment. The OSI model 800 for cloud computing environments partitions data flow in a communication system into six layers of abstraction. The OSI model 800 for cloud computing environments includes an application layer 802, a service layer 804, an image layer 806, a software-defined data center layer 808, a hypervisor layer 810, and an infrastructure layer 812. The respective layers serve a class of functionality to the layer above it and are served by the layer below it, every single layer. Various communication protocols can realize classes of functionality in software.

The application layer 802 interacts with software applications that implement a communication component. The application layer 802 is the layer that is closest to the end-user devices 104. Functions of the application layer 802 include identifying communication partners, determining resource availability, and synchronizing communication. The applications within the application layer 802 include custom code that uses middleware defined in the service layer 804.

The service layer 804 provides the middleware, such as functional components, that applications use across tiers. In some examples, the middleware components include databases, load balancers, web servers, message queues, email services, or other notification methods. The middleware components can be defined at the service layer 804 on top of particular images from the image layer 806. Different cloud computing environment providers can have different middleware components.

The image layer 806 uses various operating systems (OS) and other pre-installed software components. Patch management identifies, acquires, installs, and verifies patches for products and systems. Patches are used to correct security and functionality issues in software. The patches are further used to add new features to operating systems, including security capabilities. The image layer 806 focuses on compute rather than storage and networking. The instances within the cloud environments can be provided in image layer 806.

The software-defined data center layer 808 provides resource pooling, usage tracking, and governance on top of the hypervisor layer 810. The software-defined data center layer 808 enables virtualization for the infrastructure-as-code concept using REST APIs. The management of block storage devices can be virtualized, and the end-user device(s) 104 can be provided with a self-service API to request and consume those resources, without entailing any knowledge of where the storage is deployed or on what type of device. Various compute nodes can be balanced for storage.

The hypervisor layer 810 performs virtualization to permit the physical devices to be divided into the VM(s) 204 that can be bin packed onto physical machines for efficiency. The hypervisor layer 810 provides virtualized computing, storage, and networking. For example, OpenStack® software installed on bare-metal servers in the POP provides virtualized cloud capabilities. The OpenStack® software provides various infrastructure management capabilities to cloud operators and administrators and can utilize the infrastructure-as-code concept for deployment and lifecycle management of a cloud data center. In the Infrastructure-as-Code concept, the infrastructure elements are described in definition files. Changes in the files are reflected in the configuration of data center hosts and cloud services.

The infrastructure layer 812 includes hardware, such as physical devices in the data center that provide the foundation for the rest of the layers. The infrastructure layer 812 transmits and receives unstructured raw data between a device and a physical transmission medium. For example, the infrastructure layer 812 converts the digital bits into electrical, radio, or optical signals.

Various features discussed above can be implemented at one or more layers of the OSI model 800 in cloud environments. For example, translating the general policies into specific policies for different cloud environments can be performed at the service layer 804 and the software-defined data center layer 808. Various scripts can be updated across the service layer 804, the image layer 806, and the software-defined data center layer 808. Further, the APIs and policies can operate at the software-defined data center layer 808 and the hypervisor layer 810.

Different cloud environments have distinct service, image, software-defined data center, hypervisor, and infrastructure layers. Further, different cloud environments can have the application layer 802 that makes calls to the specific policies in the service layer 804 and the software-defined data center layer 808. The application layer 802 can have noticeably the same format and operation for different cloud environments. Accordingly, developers for the application layer 802 do not want to understand the peculiarities of how respective cloud computing environments operate in the other layers.

Referring next to FIG. 9, an alert report 900 generated for the UEBA 414 via the DLP server 108 is shown as an embodiment. The alert report 900 is in a JavaScript Object Notation (JSON)-style representation. The alert report 900 is not exhaustive of the fields logged, but it highlights the events that occurred during an active session on the end-user device 104. The alert report 900 provides user-by-user and file-by-file data on the interaction between the end-user device 104 and the DLP server 108. For example, the alert report 900 includes the ID, the geographical location, a source region of the end-user device 104, a user activity, application under usage, threat type, threat class, and a policy-based authorization decision.

Figure 10:
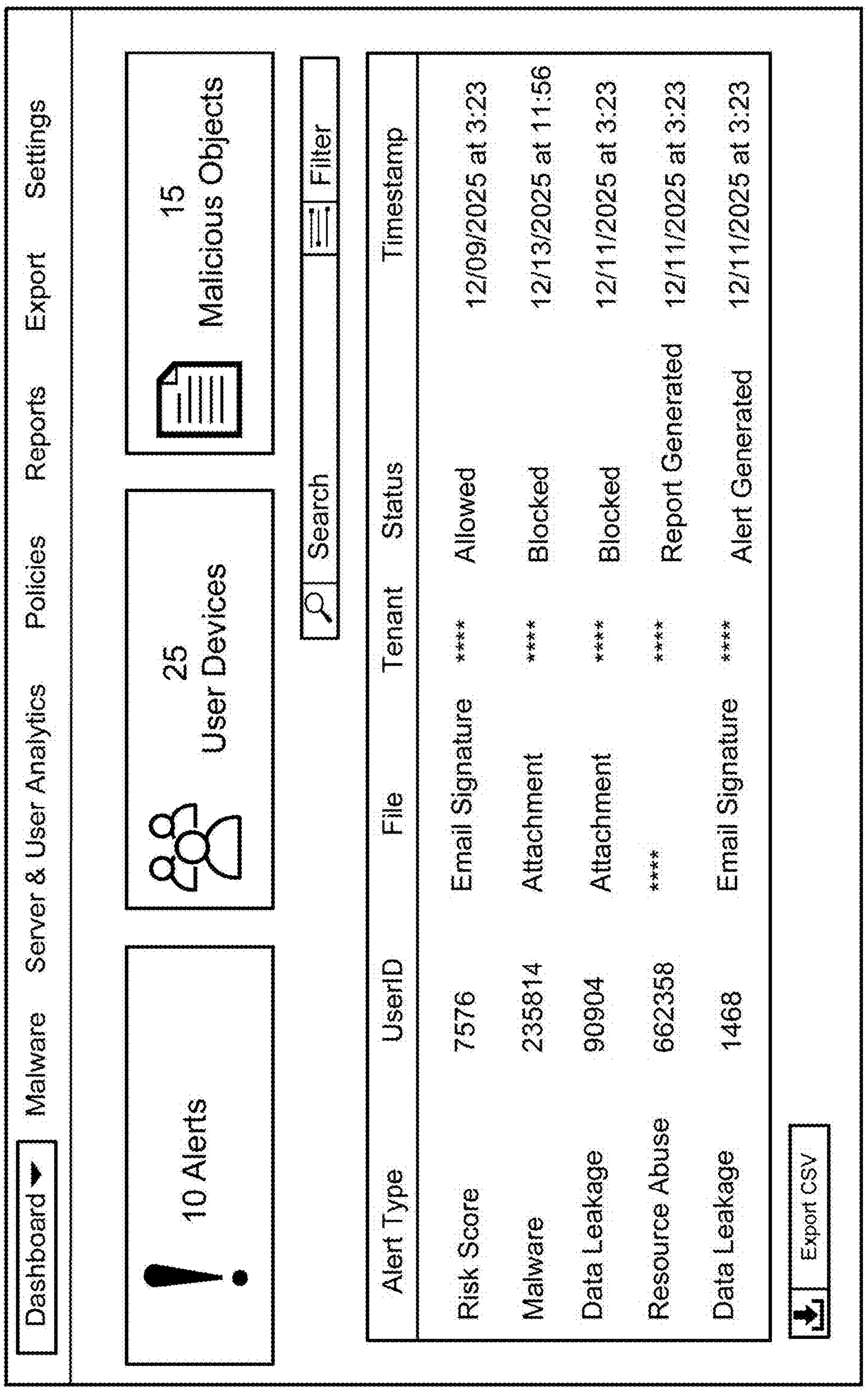
FIG. 10 illustrates a dashboard for a UEBA team for electronic inspection.

Referring next to FIG. 10, a dashboard 1000 for a UEBA team for electronic inspection is shown as an embodiment. The dashboard 1000 lists the threats and alerts that require the attention of investigators/administrators or the UEBA team. For example, the dashboard 1000 shows 10 alerts raised by the DLP server 108. These alerts concern 25 end-user devices and include 15 malicious objects. The dashboard 1000 also provides a detailed list of the alerts. The detailed list provides specifications such as the time, the user it concerns, the relevant data object, the tenant 102 the user belongs to, and the action taken by the DLP server 108, as mentioned under the status heading.

Figure 11:
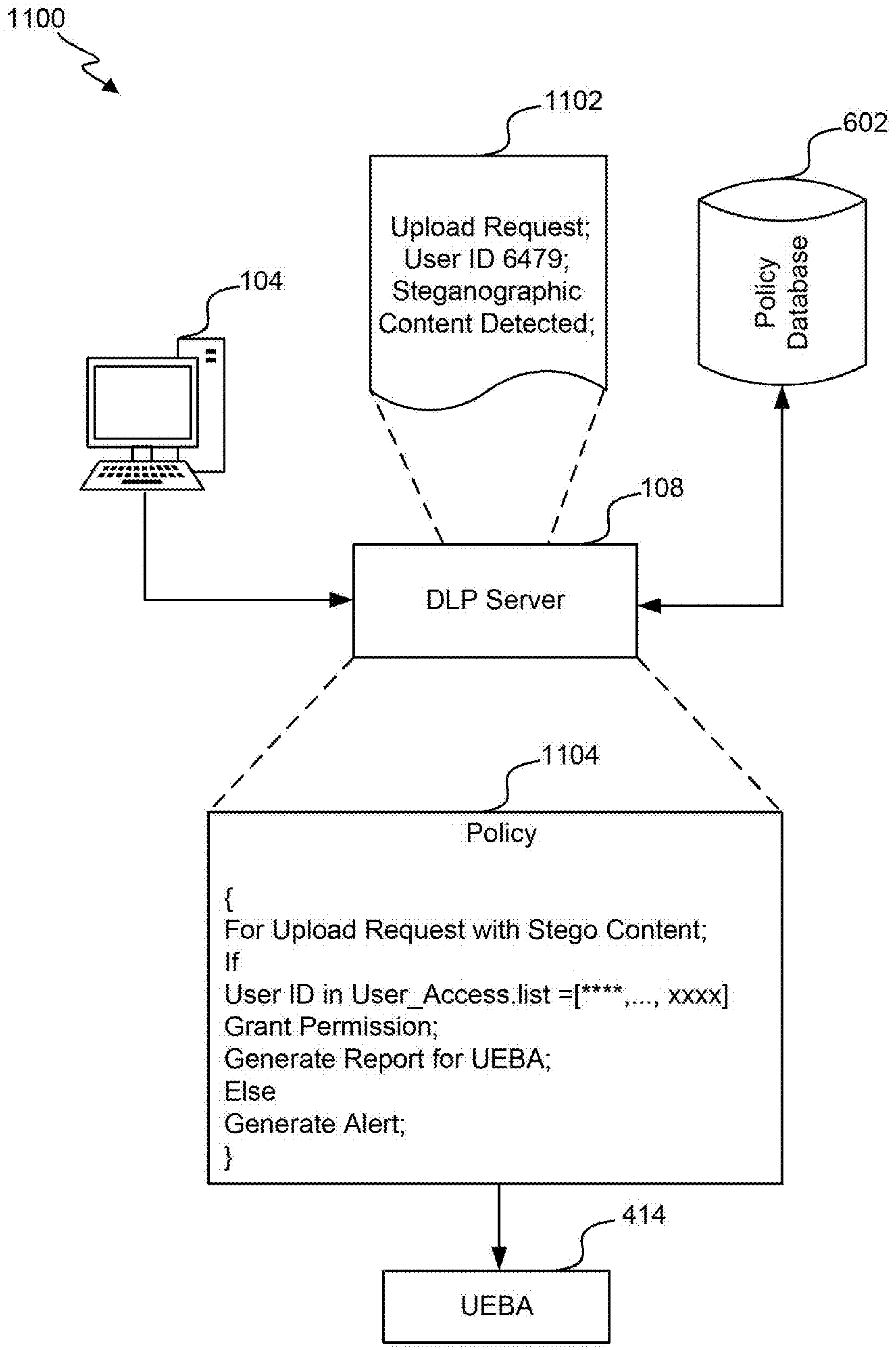
FIG. 11 illustrates a policy enforcement by the DLP server based on the risk score and contextual information of the end-user device.

Referring next to FIG. 11, a policy enforcement 1100 by the DLP server 108 based on the risk score and the contextual information of the end-user device 104 is shown as an embodiment. The end-user device 104 attempts to send the confidential information across the multi-tenant environment through steganography. Since the DLP server 108 intercepts the network traffic at the application layer 802, the DLP server 108 computes the risk score and analyzes the contextual information of the end-user device 104 at the application layer 802. Based on a brief event report 1102, the DLP server 108 refers to the policy database 612 to confirm whether the end-user device 104, based on the role and privilege levels, is authorized to do so. The DLP server 108 retrieves a policy report 1104 from the policy database 612. If the user ID 6479 is present in the User_Access.list, the DLP server 108 will categorize the upload request as an authorized access and vice versa. If the upload request is unauthorized, the DLP server 108 will increase the risk count and follow the remediation steps that are also governed by the policies. The DLP server 108 retrieves the policy report 1104 and informs the UEBA 414 about the actions, querying for further investigation.

Figure 12:
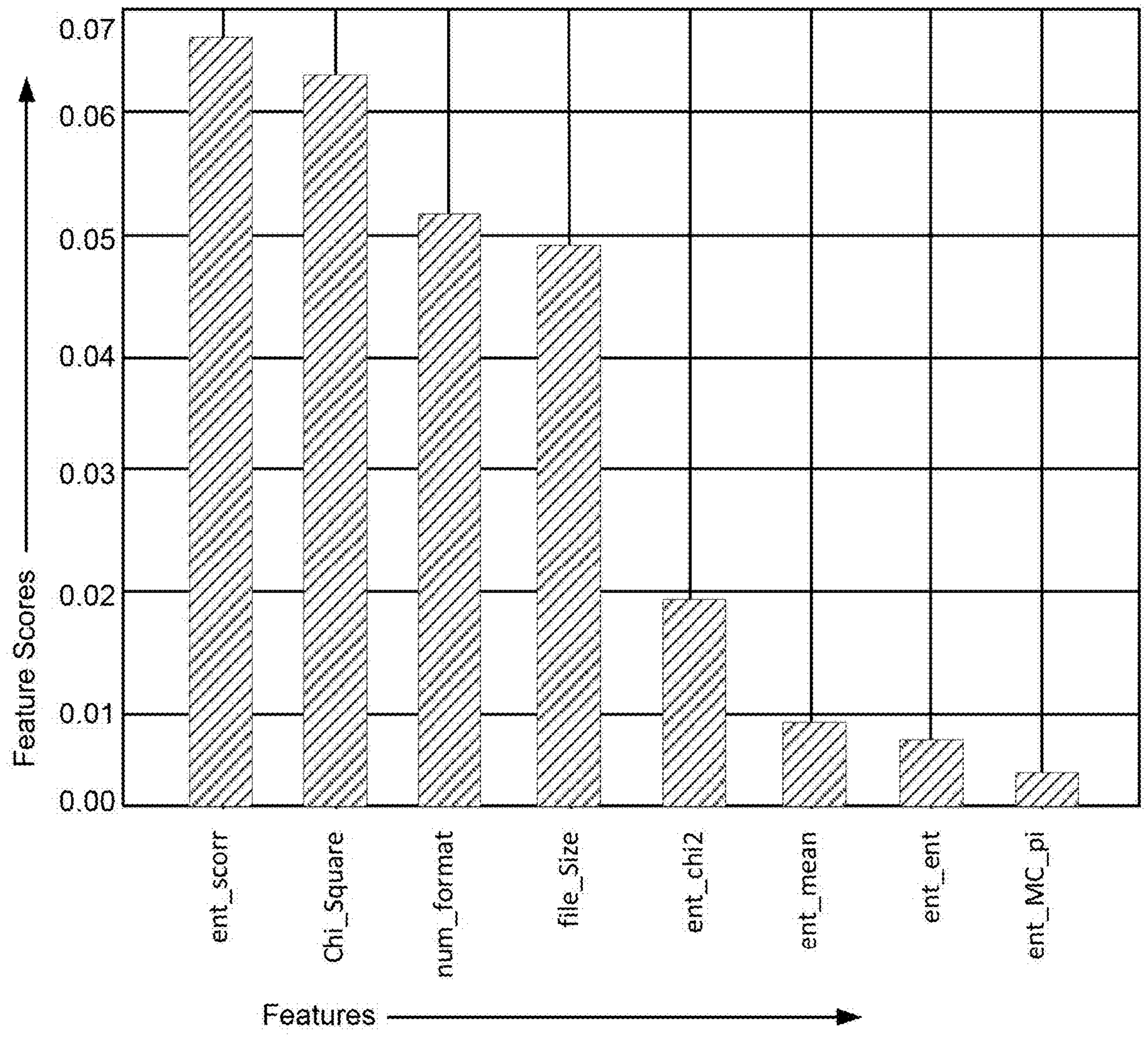
FIG. 12 illustrates a bar chart of feature scores for a machine learning (ML) engine of the DLP system.

Referring next to FIG. 12, a bar chart 1200 of feature scores for the ML engine 408 of the DLP system 100 is shown as an embodiment. The bar chart 1200 shows the feature scores, based on their significance, for the classifier 714 of the ML engine 408 and the dataset. A permutation importance method calculates the feature scores. The permutation importance method measures how much the classifier's performance varies when feature values are randomly shuffled. The x-axis demonstrates the feature names, and the y-axis demonstrates the feature scores. The performance of the classifier 714 relies heavily on the $\chi^2$ statistic for pixel color. The features, such as the $\pi$ Monte-Carlo value and byte-wise mean, contribute insignificantly and can be removed or used during dimensionality reduction. As some of the features contribute insignificantly to the performance of the classifier 714 and some of the features have a heavy influence on the performance, the DLP server 108 assigns priority to the features based on the associated memory footprint and feature scores.

For initial deployment, the DLP server 108 works in a silent mode to evaluate the online performance. Since the data/images will be unlabelled, to judge the online efficacy of the ML engine 408, distributions of the features found online are compared to those expected for steganographic and non-steganographic contents/samples. As there is a cost to saving every single feature, the DLP server 108 sorts the features according to the priority as shown in Table I.

TABLE I

Feature sorting based on assigned feature priority via the DLP server 108

| Feature | Type/Size |
|---|---|
| High Priority | |
| Image type | Short int |
| Serial correlation coefficient | Single float |
| Pixel color $\chi^2$ | Single float |
| File size | Int |
| Image entropy/File entropy | Single float |
| Low Priority | |
| File extension | String |
| File name | String |
| File $\chi^2$ | Single Float |
| File bit-wise mean | Single Float |
| File $\pi$ monte-carlo | Single Float |

Figure 13:
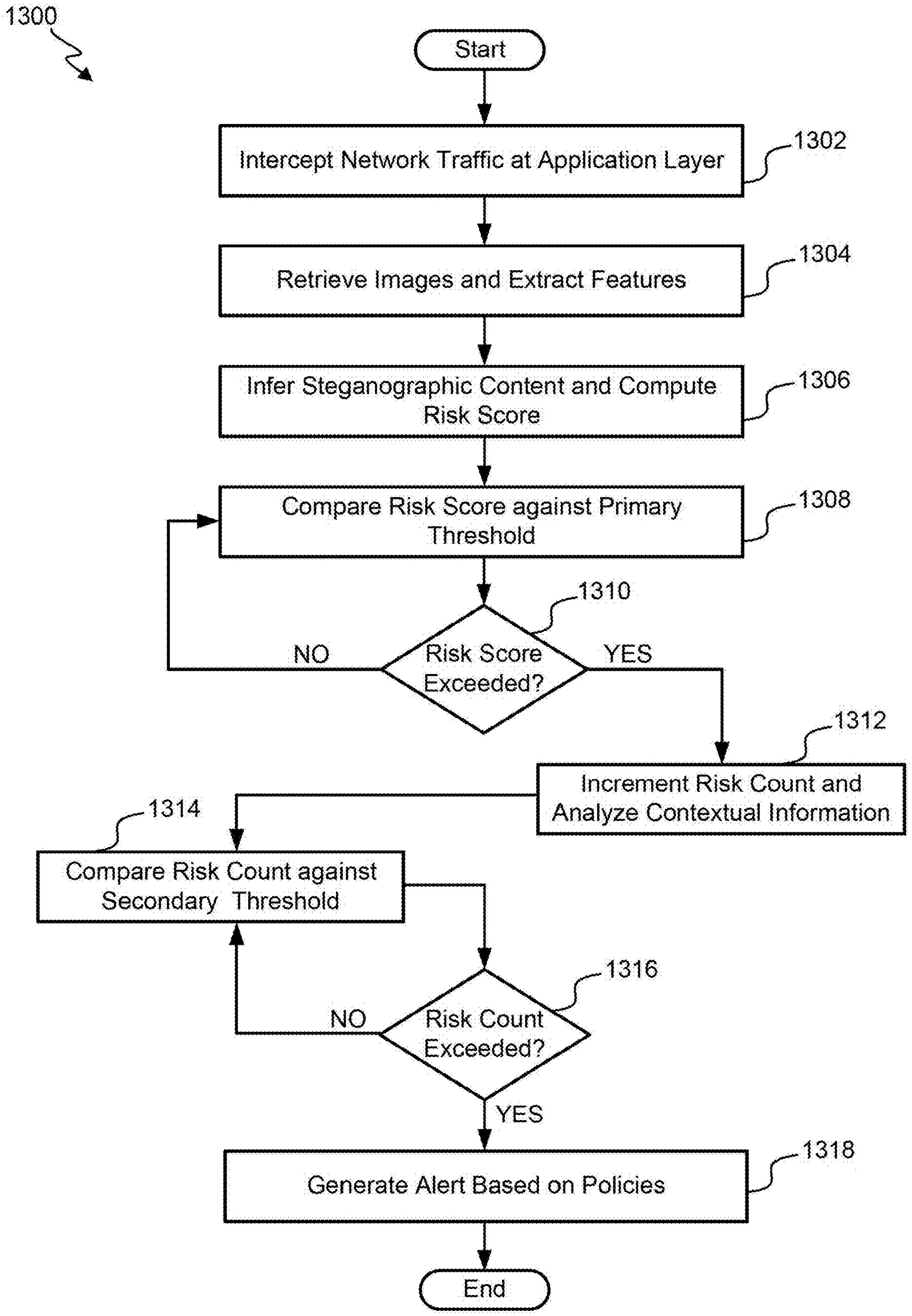
FIG. 13 illustrates a DLP method for preventing data exfiltration across tenants in the cloud network.

Referring next to FIG. 13, a DLP method 1300 for preventing the data exfiltration across the tenants 102 in the cloud network is shown as an embodiment. Across the cloud network, the end-user devices 104 communicate within their tenancy and/or with the end-user devices 104 from other tenants to access and share data. The data sharing promotes dynamic communication and supports automated backups. However, data sharing across the end-user devices 104 poses data breach risks due to the embedding of sensitive information within the images and the network traffic. The end-user device 104, in some examples, conceals confidential data into content shared over the cloud network, leading to unauthorized access of confidential data and reputational damage for the enterprise(s) 116.

The DLP system 100 infers the images embedded with the steganographic samples/content shared across the end-user devices 104. The DLP system 100 prevents data exfiltration across the end-user devices 104 in the cloud network and detects malware payloads embedded in the network traffic. The DLP system 100 detects steganographic images using a broader range of the steganographic techniques. In an embodiment, the DLP system 100 prevents data exfiltration, infers the steganographic content in the images, and identifies malware payloads in network traffic based on the contextual information of the end-user devices 104. In another embodiment, the DLP system 100 factors in the geographical location of the end-user devices 104 to generate the alert regarding data breaches.

At block 1302, the DLP system 100 intercepts the network traffic via the traffic analyzer 402. The traffic analyzer 402 examines the payloads by using DPI from the network traffic, in place of examining headers alone. The traffic analyzer 402 identifies files shared across the end-user devices 104 and differentiates between file formats by unpacking container formats. The traffic analyzer 402 intercepts the network traffic at the application layer 802 and analyzes file signatures and metadata.

At block 1304, the DLP server 108 retrieves the images from the network traffic via the image retriever 404. The image retriever 404 extracts the images from the network traffic intercepted by the traffic analyzer 402. The images appear in multiple contexts in the network traffic. For example, a standalone image shared via FTP, an image transferred via email attachment and shared via SMTP, or an image uploaded over HTTPS in the shared repository by the end-user device 104. The image includes the unencrypted image and/or the encrypted image. The DLP server 108 stores the retrieved images in the image database 412. The DLP server 108 extracts the features from the images via the feature extractor 406, which identifies and extracts multiple features from each image. The feature extractor 406 performs both pixel-level and file-level computations to extract features. The features include the pixel color $\chi^2$, the image type, and the image entropy. The features further include the byte-wise mean, the byte-wise $\chi^2$, the serial correlation coefficient, the x Monte-Carlo value, the SD in the channel entropy, and the SPA score. In an embodiment, the feature extractor 406 prioritizes the pixel color $\chi^2$, which is the goodness-of-fit across the color channels.

At block 1306, the DLP server 108, via the ML engine 408, infers the steganographic content in the images and computes the risk score. The ML engine 408 outputs the risk score indicating the probability of the steganographic content or the malware payload in the network traffic and/or the images. The ML engine 408 includes the classifier 714. In an embodiment, the ML classifier is the random forest classifier that generates the risk scores by averaging predictions from the trees.

At block 1308, the DLP server 108 compares the risk score against the primary threshold via the threshold enforcer 720. For example, the risk score for the end-user device 104 below or around 85% indicates that steganographic detection is triggered by image noise, and further investigation is not desired for that particular end-user. The risk score exceeding the primary threshold indicates the presence of the steganographic content in the media/images/files shared by the end-user device 104. At block 1310, the threshold enforcer 720 confirms whether the risk score exceeds the primary threshold. If not, the threshold enforcer 720 continues to compare the risk score against the primary threshold. If exceeded, the DLP server 108 increments the risk count and analyzes the contextual information of the end-user device 104 at block 1312.

When the risk score exceeds the primary threshold for the end-user device 104, the score counter 716 increments the score count. The score count indicates the frequency with which the end-user device 104 attempts to either send confidential data out of the enterprise(s) 116 via steganography or to embed the malware payloads in network traffic. The contextual information includes the device identifier (ID), session details, profile data, behavioral data, and metadata of the end-user device 104. The application layer enforces RBAC based on the user attributes and the contextual information of the end-user device 104. The context engine 718 accesses tokens, IdPs, and/or active directories to fetch contextual information. The context engine 718 retrieves the user ID, session tokens, authorization attributes including user roles and privilege levels, job title, geographical location, user tables, user activity within the tenant 102, and/or IP address.

Based on the contextual information, the DLP server 108 compares the risk count against the secondary threshold at block 1314. The secondary threshold indicates that the network traffic includes the steganographic content or malware payloads, and that the end-user device 104 has made multiple attempts to transfer the confidential data out of the enterprise(s) 116. At block 1316, the DLP server 108 checks whether the risk count exceeds the secondary threshold. If not, the threshold enforcer 720 continues to compare the risk count against the secondary threshold. Otherwise, the alert generator 410 generates the alert based on the policies of the tenants 102 at block 1318. The alert generator 410 further generates the report of the user actions of the end-user device 104. The DLP server 108 routes the alert or report to UEBA 414 to create the baseline of user behavior patterns. The UEBA 414, based on the risk scores and risk counts, generates behavioral intelligence and the baseline for user activity within the multi-tenant environment or enterprise(s) 116.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process that is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a computer-readable medium such as a storage medium. A code segment or computer-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any computer-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, non-volatile, or other storage medium and is not to be limited to any particular type of memory or number of memories, or type of media upon which memory is stored.

Moreover, as disclosed herein, the term "storage medium" may represent one or more memories for storing data, including read-only memory (ROM), random access memory (RAM), magnetic RAM, core memory, magnetic disk storage mediums, optical storage mediums, flash memory devices and/or other computer-readable media for storing information. The term "computer-readable medium" includes but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as a limitation on the scope of the disclosure.

We claim:

1. A data loss prevention (DLP) system to prevent data exfiltration across a plurality of tenants in a cloud network, the DLP system comprises:

- a tenant of the plurality of tenants in the cloud network, the tenant comprises a plurality of end-user devices; and
- a DLP server functioning as middleware and operable to:
  - intercept network traffic of an end-user device of the plurality of end-user devices at an application layer of the cloud network,
  - retrieve an image of a plurality of images from the network traffic,
  - extract a plurality of features from the image, wherein the plurality of features comprises one or more of a pixel color chi-squared, an image type, and an image entropy,
  - infer from the plurality of features, via a machine learning (ML) engine, a steganographic content in the image and compute a risk score for the end-user device based on the steganographic content,
  - compare the risk score against a primary threshold and increment a risk count when the risk score exceeds the primary threshold,
  - analyze a contextual information of the end-user device from the application layer, and
  - based on the contextual information, compare the risk count against a secondary threshold and generate an alert based on a plurality of policies when the risk count exceeds the secondary threshold.

2. The DLP system to prevent the data exfiltration across the plurality of tenants in the cloud network of claim 1, wherein the DLP server is further operable to analyze the contextual information and generate the alert based on detection of one or more of:

- the image comprising the steganographic content; and
- the network traffic carrying a malware payload, wherein the malware payload comprises an unencrypted malware from a malware database.

3. The DLP system to prevent the data exfiltration across the plurality of tenants in the cloud network of claim 1, wherein the ML engine comprises a plurality of ML classifiers, and wherein the plurality of ML classifiers comprises one or more of a plurality of pre-trained classifiers and a plurality of customized classifiers.

4. The DLP system to prevent the data exfiltration across the plurality of tenants in the cloud network of claim 1, wherein the plurality of features further comprises one or more of a byte-wise mean, a byte-wise chi-squared, a serial correlation coefficient, a Pi Monte-Carlo value, a standard deviation (SD) in a channel entropy, and a spatial pair analysis (SPA) score.

5. The DLP system to prevent the data exfiltration across the plurality of tenants in the cloud network of claim 1, wherein the DLP server is further operable to assign a priority to the plurality of features based on an associated memory footprint.

6. The DLP system to prevent the data exfiltration across the plurality of tenants in the cloud network of claim 1, wherein the image of the plurality of images comprises one or more of an unencrypted image and an encrypted image.

7. The DLP system to prevent the data exfiltration across the plurality of tenants in the cloud network of claim 1, wherein the contextual information comprises one or more of a device identifier (ID), session details, profile data, behavioural data, and metadata of the end-user device.

8. The DLP system to prevent the data exfiltration across the plurality of tenants in the cloud network of claim 1, wherein the risk score indicates a probability of one or more of the steganographic content and a malware payload in the network traffic.

9. A data loss prevention (DLP) method to prevent data exfiltration across a plurality of tenants in a cloud network, the DLP method comprises:

intercepting network traffic of an end-user device of a plurality of end-user devices at an application layer of the cloud network via a DLP server, wherein the DLP server functions as a middleware and is operable to:

retrieve a plurality of images from the network traffic, extract a plurality of features from an image of the plurality of images, wherein the plurality of features comprises one or more of a pixel color chi-squared, an image type, and an image entropy, infer from the plurality of features, via a machine learning (ML) engine, a steganographic content in the image, compute a risk score for the end-user device based on the steganographic content and compare the risk score against a primary threshold, increment a risk count when the risk score exceeds the primary threshold and analyze a contextual information of the end-user device, and based on the contextual information, compare the risk count against a secondary threshold and generate an alert based on a plurality of policies when the risk count exceeds the secondary threshold.

10. The DLP method to prevent the data exfiltration across the plurality of tenants in the cloud network of claim 9, wherein the DLP server is further operable to analyze the contextual information and generate the alert based on detection of one or more of:

the image of the plurality of images comprising the steganographic content; and the network traffic carrying a malware payload, wherein the malware payload comprises an unencrypted malware from a malware database.

11. The DLP method to prevent the data exfiltration across the plurality of tenants in the cloud network of claim 9, wherein the plurality of features further comprises one or more of a byte-wise mean, a byte-wise chi-squared, a serial correlation coefficient, a Pi Monte-Carlo value, a standard deviation (SD) in a channel entropy, and a spatial pair analysis (SPA) score.

12. The DLP method to prevent the data exfiltration across the plurality of tenants in the cloud network of claim 9, wherein the DLP server is further operable to assign a priority to the plurality of features based on an associated memory footprint.

13. The DLP method to prevent the data exfiltration across the plurality of tenants in the cloud network of claim 9, wherein the contextual information comprises one or more of a device identifier (ID), session details, profile data, behavioural data, and metadata of the end-user device.

14. The DLP method to prevent the data exfiltration across the plurality of tenants in the cloud network of claim 9, wherein the risk score indicates a probability of one or more of the steganographic content and a malware payload in the network traffic.

15. A computer-readable medium having computer-executable instructions embodied thereon that, when executed by one or more processors, facilitates a data loss prevention (DLP) method to prevent data exfiltration across a plurality of tenants in a cloud network, the DLP method comprises:

intercepting network traffic of an end-user device of a plurality of end-user devices at an application layer;

retrieving a plurality of images from the network traffic;

extracting a plurality of features from the plurality of images, wherein the plurality of features comprises one or more of a pixel color chi-squared, an image type, and an image entropy;

inferring from the plurality of features, via a machine learning (ML) engine, a steganographic content in an image of the plurality of images;

computing a risk score for the end-user device based on the steganographic content and comparing the risk score against a primary threshold;

incrementing a risk count when the risk score exceeds the primary threshold; and based on a contextual information of the end-user device from the application layer, comparing the risk count against a secondary threshold and generating an alert based on a plurality of policies when the risk count exceeds the secondary threshold.

16. The computer-readable medium having computer-executable instructions embodied thereon that, when executed by one or more processors, facilitates the data loss prevention (DLP) method to prevent the data exfiltration across the plurality of tenants in the cloud network of claim 15, wherein the analysis of the contextual information and generation of the alert comprise analysing the contextual information and generating the alert based on detection of one or more of:

the image comprising the steganographic content; and the network traffic carrying a malware payload, wherein the malware payload comprises an unencrypted malware from a malware database.

17. The computer-readable medium having computer-executable instructions embodied thereon that, when executed by one or more processors, facilitates the data loss prevention (DLP) method to prevent data exfiltration across the plurality of tenants in the cloud network of claim 15, wherein the image of the plurality of images comprises one or more of an unencrypted image and an encrypted image.

18. The computer-readable medium having computer-executable instructions embodied thereon that, when executed by one or more processors, facilitates the data loss prevention (DLP) method to prevent data exfiltration across the plurality of tenants in the cloud network of claim 15, wherein the contextual information comprises one or more of a device identifier (ID), session details, profile data, behavioural data, and metadata of the end-user device.

19. The computer-readable medium having computer-executable instructions embodied thereon that, when executed by one or more processors, facilitates the data loss prevention (DLP) method to prevent data exfiltration across the plurality of tenants in the cloud network of claim 15, wherein the plurality of features further comprises one or more of a byte-wise mean, a byte-wise chi-squared, a serial correlation coefficient, a Pi Monte-Carlo value, a standard deviation (SD) in a channel entropy, and a spatial pair analysis (SPA) score.

20. The computer-readable medium having computer-executable instructions embodied thereon that, when executed by one or more processors, facilitates the data loss prevention (DLP) method to prevent data exfiltration across the plurality of tenants in the cloud network of claim 15, wherein the risk score indicates a probability of one or more of the steganographic content and a malware payload in the network traffic.

* * * * *